United States Patent
Rose et al.

(10) Patent No.: US 10,166,844 B2
(45) Date of Patent: Jan. 1, 2019

(54) VEHICLE HOOD SHIELD AND BRACKET SYSTEM

(71) Applicant: Lund, Inc., Buford, GA (US)

(72) Inventors: Brent Lorenz Rose, Jefferson, GA (US); Roberto Melo Braga, Portland, OR (US); Jonathan Shroyer, Buford, GA (US); William Franklin Bibb, VI, Littleton, CO (US)

(73) Assignee: Lund, Inc., Buford, GA (US)

( * ) Notice: Subject to any disclaimer, the term of this patent is extended or adjusted under 35 U.S.C. 154(b) by 0 days.

(21) Appl. No.: 15/851,525

(22) Filed: Dec. 21, 2017

(65) Prior Publication Data

US 2018/0222292 A1 Aug. 9, 2018

Related U.S. Application Data

(63) Continuation of application No. 15/072,195, filed on Mar. 16, 2016, now Pat. No. 9,878,600.

(60) Provisional application No. 62/249,131, filed on Oct. 30, 2015.

(51) Int. Cl.
*B60J 1/20* (2006.01)
*B60J 11/06* (2006.01)

(52) U.S. Cl.
CPC ............. *B60J 1/2005* (2013.01); *B60J 11/06* (2013.01)

(58) Field of Classification Search
CPC .................................. B60J 1/2005; B60J 11/06
USPC .................................... 296/91, 180.1, 193.11
See application file for complete search history.

(56) References Cited

U.S. PATENT DOCUMENTS

| | | |
|---|---|---|
| D50,345 S | 2/1917 | Green |
| D50,346 S | 2/1917 | Green |
| 1,453,340 A | 5/1923 | Druar |
| 1,588,654 A | 6/1926 | Brownlee |
| 1,787,035 A | 12/1930 | Davis |
| 1,811,527 A | 6/1931 | Young |
| D85,241 S | 9/1931 | Henderson |
| 1,825,192 A | 9/1931 | Mace |
| 2,054,538 A | 9/1936 | Graves et al. |
| 2,059,305 A | 11/1936 | Best |
| 2,073,159 A | 3/1937 | Lintern et al. |
| 2,106,418 A | 1/1938 | Wagner |
| 2,184,798 A | 12/1939 | Gracey |
| 2,281,840 A | 5/1942 | Hamilton |
| 2,475,901 A | 7/1949 | Kipp |
| D154,735 S | 8/1949 | Airbib |
| D154,861 S | 8/1949 | Maher |
| D156,679 S | 12/1949 | Stiles |
| D157,555 S | 3/1950 | Abrams |
| D159,144 S | 6/1950 | Dieterich |

(Continued)

FOREIGN PATENT DOCUMENTS

| | | |
|---|---|---|
| CA | 64 701 A | 11/1899 |
| CA | 76 555 A | 7/1902 |

(Continued)

*Primary Examiner* — Jason S Morrow
(74) *Attorney, Agent, or Firm* — Knobbe, Martens, Olson & Bear, LLP

(57) ABSTRACT

Disclosed herein are embodiments of a vehicle hood shield for use in protecting a vehicle hood from damage while the vehicle is in motion. The vehicle hood shield can be attached through the use of different adhesive taping configurations. Further, in some embodiments an attachment clip can be used to retain the vehicle hood shield to the vehicle hood.

20 Claims, 13 Drawing Sheets

(56) References Cited

U.S. PATENT DOCUMENTS

| | | |
|---|---|---|
| 2,534,763 A | 12/1950 | Flavin |
| 2,566,934 A | 9/1951 | Dieterich |
| 2,567,501 A | 9/1951 | Zeis |
| 2,599,809 A | 6/1952 | Branch |
| D167,676 S | 9/1952 | Chicorel |
| 2,749,830 A | 6/1956 | Landon |
| 2,757,954 A | 8/1956 | Hurley |
| 2,777,732 A | 1/1957 | Walsh |
| 2,792,254 A | 5/1957 | Hagglund |
| 2,793,705 A | 5/1957 | Garrity |
| 2,857,973 A | 10/1958 | Garrity |
| 2,859,680 A | 11/1958 | Edwards |
| 2,949,842 A | 8/1960 | Crandall |
| 3,015,517 A | 1/1962 | Thornburgh |
| 3,022,848 A | 2/1962 | Bennett |
| D201,496 S | 6/1965 | Stef |
| 3,214,216 A | 10/1965 | Brown, Jr. |
| 3,434,408 A | 3/1969 | Rivers |
| 3,487,420 A | 12/1969 | Herr |
| 3,678,635 A | 7/1972 | Vagi et al. |
| 3,695,674 A | 10/1972 | Baker |
| 3,728,537 A | 4/1973 | Barenyi et al. |
| 3,736,404 A | 5/1973 | Eisler |
| 3,785,699 A | 1/1974 | Molaskey |
| 3,815,700 A | 6/1974 | Mittendorf |
| 3,866,524 A | 2/1975 | Forbes, Jr. |
| 3,866,527 A | 2/1975 | Katris |
| D239,705 S | 4/1976 | Lund |
| 3,987,863 A | 10/1976 | Mittendorf |
| 4,018,472 A | 4/1977 | Mason, Jr. |
| 4,039,221 A | 8/1977 | Eady |
| 4,040,656 A | 8/1977 | Clenet |
| 4,043,587 A | 8/1977 | Giallourakis |
| 4,052,099 A | 10/1977 | Lowery et al. |
| 4,063,773 A | 12/1977 | Modesette |
| 4,089,256 A | 5/1978 | Furcini |
| 4,099,760 A | 7/1978 | Mascotte |
| 4,149,749 A | 4/1979 | Canal |
| 4,153,129 A | 5/1979 | Redmond |
| 4,159,845 A | 7/1979 | Bratsberg |
| D252,680 S | 8/1979 | Kingsley et al. |
| 4,169,608 A | 10/1979 | Logan |
| 4,174,021 A | 11/1979 | Barlock |
| 4,178,034 A | 12/1979 | Mittendorf |
| 4,191,097 A | 3/1980 | Groen |
| 4,219,870 A | 8/1980 | Haraden et al. |
| 4,262,954 A | 4/1981 | Thompson |
| D259,873 S | 7/1981 | Milner |
| D261,500 S | 10/1981 | Butler |
| 4,309,056 A | 1/1982 | Long |
| 4,320,919 A | 3/1982 | Butler |
| D264,833 S | 6/1982 | Trombley et al. |
| 4,347,781 A | 9/1982 | Hassell |
| 4,364,591 A | 12/1982 | Bien |
| 4,412,698 A | 11/1983 | Kingsley |
| D272,429 S | 1/1984 | Trombley et al. |
| 4,423,668 A | 1/1984 | Long |
| D273,672 S | 5/1984 | Lund |
| 4,447,067 A | 5/1984 | Yamashita |
| 4,471,991 A | 9/1984 | Matthias |
| 4,476,774 A | 10/1984 | Liberto et al. |
| 4,493,577 A | 1/1985 | Cosenza |
| 4,527,466 A | 7/1985 | Kossor et al. |
| 4,547,013 A | 10/1985 | McDaniel |
| D283,120 S | 3/1986 | Trombley et al. |
| D283,611 S | 4/1986 | Kingsley |
| 4,592,937 A | 6/1986 | Nagata et al. |
| D284,565 S | 7/1986 | Trombley et al. |
| 4,605,238 A | 8/1986 | Arenhold |
| 4,621,824 A | 11/1986 | Arenhold |
| 4,627,657 A | 12/1986 | Daniels et al. |
| D288,309 S | 2/1987 | Lund |
| D288,310 S | 2/1987 | Lund |
| D291,295 S | 8/1987 | Lund |
| 4,685,718 A | 8/1987 | Steenblik et al. |
| 4,700,980 A | 10/1987 | Josefczak |
| 4,707,014 A | 11/1987 | Rich |
| 4,709,938 A | 12/1987 | Ward et al. |
| 4,726,619 A | 2/1988 | Haugestad |
| D294,707 S | 3/1988 | Cameron |
| 4,750,549 A | 6/1988 | Ziegler et al. |
| 4,756,242 A | 7/1988 | Keith |
| 4,758,040 A | 7/1988 | Kingsley |
| 4,776,627 A | 10/1988 | Hutto |
| 4,784,430 A | 11/1988 | Biermacher |
| D299,713 S | 2/1989 | Dunham |
| 4,819,136 A | 4/1989 | Ramsey |
| D300,918 S | 5/1989 | Turner |
| D301,028 S | 5/1989 | Buck |
| D301,450 S | 6/1989 | Kingsley |
| 4,842,319 A | 6/1989 | Ziegler et al. |
| 4,842,320 A | 6/1989 | Kingsley |
| 4,842,912 A | 6/1989 | Hutter, III |
| 4,844,529 A | 7/1989 | O'Saben |
| D304,437 S | 11/1989 | Eash |
| D304,819 S | 11/1989 | Chapman et al. |
| 4,904,014 A | 2/1990 | Azarovitz et al. |
| 4,923,241 A | 5/1990 | Miller |
| 4,929,013 A | 5/1990 | Eke |
| 4,966,404 A | 10/1990 | Lund |
| D312,238 S | 11/1990 | Lund |
| 2,236,846 A | 4/1991 | Davisson |
| D319,209 S | 8/1991 | Miller |
| 5,042,551 A | 8/1991 | Ein et al. |
| 5,048,868 A | 9/1991 | Arenhold |
| 5,067,760 A | 11/1991 | Moore |
| 5,082,321 A * | 1/1992 | Brewer ............... B60J 1/20 296/91 |
| 5,112,095 A | 5/1992 | Lund et al. |
| 5,114,205 A | 5/1992 | Jee |
| D326,636 S | 6/1992 | Barth |
| 5,120,082 A | 6/1992 | Ito |
| 5,130,906 A | 7/1992 | Lund |
| 5,150,941 A | 9/1992 | Silzer et al. |
| 5,183,303 A | 2/1993 | Zoller |
| 5,238,268 A | 8/1993 | Logan |
| 5,251,953 A | 10/1993 | Willey |
| 5,280,386 A | 1/1994 | Johnson et al. |
| 5,308,134 A | 5/1994 | Stanesic |
| 5,320,461 A | 6/1994 | Stanesic |
| 5,340,154 A | 8/1994 | Scott |
| 5,348,363 A | 9/1994 | Fink |
| 5,353,571 A | 10/1994 | Berdan et al. |
| D352,491 S | 11/1994 | Galasso |
| 5,403,059 A | 4/1995 | Turner |
| 5,456,786 A | 10/1995 | Cook et al. |
| 5,460,425 A | 10/1995 | Stephens |
| 5,475,956 A | 12/1995 | Agrawal et al. |
| 5,522,634 A | 6/1996 | Stanesic et al. |
| D375,068 S | 10/1996 | Lund |
| 5,613,710 A | 3/1997 | Waner |
| D379,956 S | 6/1997 | Baughman |
| 5,636,892 A | 6/1997 | Gordon |
| 5,651,566 A | 7/1997 | Arenhold |
| D382,239 S | 8/1997 | Logan et al. |
| 5,664,871 A | 9/1997 | Thompson |
| 5,676,418 A | 10/1997 | Strefling |
| 5,683,293 A | 11/1997 | Mohammed |
| 5,697,644 A | 12/1997 | Loga et al. |
| 5,718,283 A | 2/1998 | Naty et al. |
| 5,722,690 A | 3/1998 | Ward et al. |
| 5,755,483 A | 5/1998 | Lund |
| D395,421 S | 6/1998 | Gable et al. |
| 5,791,719 A | 8/1998 | Alley |
| 5,797,645 A | 8/1998 | Schenk et al. |
| 5,823,553 A | 10/1998 | Thompson |
| 5,829,786 A | 11/1998 | Dahl |
| 5,851,044 A | 12/1998 | Lund |
| D403,639 S | 1/1999 | Gale et al. |
| D404,698 S | 1/1999 | Schenk et al. |
| 5,879,045 A | 3/1999 | Logan |
| 5,925,425 A | 7/1999 | Nelson |
| 5,984,401 A | 11/1999 | Hannah |
| 5,988,305 A | 11/1999 | Sakai et al. |

(56) References Cited

U.S. PATENT DOCUMENTS

| | | |
|---|---|---|
| 6,019,414 A | 2/2000 | Pourciau, Sr. |
| 6,027,156 A | 2/2000 | Lund et al. |
| 6,042,473 A | 3/2000 | McClary |
| D424,495 S | 5/2000 | Damon et al. |
| D424,496 S | 5/2000 | Damon et al. |
| 6,070,908 A | 6/2000 | Skrzypchak |
| 6,099,064 A | 8/2000 | Lund |
| 6,099,065 A | 8/2000 | Lund |
| D431,511 S | 10/2000 | Damon et al. |
| D432,476 S | 10/2000 | Damon et al. |
| 6,131,681 A | 10/2000 | Nelson et al. |
| D436,335 S | 1/2001 | Beigel |
| 6,193,278 B1 | 2/2001 | Ward et al. |
| 6,205,642 B1 | 3/2001 | Czirmer |
| 6,350,195 B1 | 2/2002 | Iino |
| 6,460,914 B2 | 10/2002 | Gille et al. |
| D467,018 S | 12/2002 | Shih et al. |
| 6,511,109 B1 | 1/2003 | Schultz et al. |
| D472,655 S | 4/2003 | Lin |
| 6,547,305 B1 | 4/2003 | Ellis |
| 6,547,306 B2 | 4/2003 | Espinose et al. |
| 6,551,540 B1 | 4/2003 | Porter |
| 6,557,927 B2 | 5/2003 | Kanie |
| D478,303 S | 8/2003 | Iverson et al. |
| D478,538 S | 8/2003 | Iverson et al. |
| D482,992 S | 12/2003 | Hattori et al. |
| 6,682,126 B2 | 1/2004 | Kanie |
| 6,722,730 B2 | 4/2004 | Lydan et al. |
| D490,176 S | 5/2004 | Lin |
| 6,736,353 B1 | 5/2004 | Erben |
| D491,858 S | 6/2004 | Velazco |
| 6,752,446 B2 | 6/2004 | Espinose et al. |
| 6,805,389 B1 | 10/2004 | Schellenberg |
| 6,810,950 B1 | 11/2004 | Manze, III |
| 6,830,119 B2 | 12/2004 | Whitworth |
| 6,854,545 B1 | 2/2005 | Elwell |
| 6,910,316 B2 | 6/2005 | Espinose et al. |
| 6,959,948 B2 | 11/2005 | Varnhagen et al. |
| D517,965 S | 3/2006 | Metros et al. |
| 7,028,797 B2 | 4/2006 | White |
| 7,029,051 B2 | 4/2006 | Espinose et al. |
| 7,036,873 B2 | 5/2006 | Pommeret et al. |
| 7,044,524 B2 | 5/2006 | Luetze et al. |
| D522,427 S | 6/2006 | Beigel et al. |
| 7,114,749 B2 | 10/2006 | Ward |
| 7,131,683 B1 | 11/2006 | Gong |
| D533,810 S | 12/2006 | Metsugi et al. |
| D533,820 S | 12/2006 | Sonoda et al. |
| 7,144,075 B2 | 12/2006 | Shishikura |
| 7,156,452 B2 | 1/2007 | Schumacher et al. |
| 7,166,350 B2 | 1/2007 | Murayama |
| D536,809 S | 2/2007 | James |
| 7,172,240 B1 | 2/2007 | Kaufman |
| D539,710 S | 4/2007 | Kouyama |
| 7,204,543 B2 | 4/2007 | Mishimaji |
| 7,222,884 B2 | 5/2007 | Callan et al. |
| 7,232,246 B2 | 6/2007 | Kleber et al. |
| D546,935 S | 7/2007 | Arrowood |
| 7,246,842 B2 | 7/2007 | Yamada |
| D548,660 S | 8/2007 | Jenkins |
| D556,657 S | 12/2007 | Elwell et al. |
| D564,414 S | 3/2008 | Okue |
| D564,425 S | 3/2008 | Okue |
| 7,377,564 B1 | 5/2008 | Baffy et al. |
| D570,509 S | 6/2008 | Logan |
| D582,825 S | 12/2008 | Logan |
| D586,270 S | 2/2009 | Suga et al. |
| D590,756 S | 4/2009 | Williams et al. |
| D591,654 S | 5/2009 | Williams et al. |
| D591,655 S | 5/2009 | Golden et al. |
| D591,656 S | 5/2009 | Golden et al. |
| D591,657 S | 5/2009 | Golden et al. |
| D591,658 S | 5/2009 | Golden et al. |
| 7,537,253 B2 | 5/2009 | Rosen et al. |
| 7,578,527 B2 | 8/2009 | Iverson et al. |
| 7,589,622 B2 | 9/2009 | Farley |
| 7,717,467 B2 | 5/2010 | Iverson |
| 7,762,876 B2 | 7/2010 | McClary |
| 7,766,356 B2 | 8/2010 | Iverson |
| D623,103 S | 9/2010 | Braga |
| 7,857,352 B2 | 12/2010 | Logan |
| 8,061,747 B2 | 11/2011 | Shoup et al. |
| 8,118,329 B2 | 2/2012 | Braga |
| 8,127,501 B2 | 3/2012 | Nakao |
| 8,147,300 B2 | 4/2012 | Lunghofer |
| 8,360,500 B2 | 1/2013 | Mishimagi |
| 8,382,193 B2 | 2/2013 | Ezaka |
| 8,651,554 B1 | 2/2014 | Patelczyk et al. |
| 8,998,290 B2 | 4/2015 | Serentill et al. |
| 9,121,426 B2 | 9/2015 | Jagoda |
| 9,302,639 B2 | 4/2016 | Patelczyk |
| 9,616,945 B1 * | 4/2017 | Henderson ........... B62D 35/008 |
| 9,630,481 B2 | 4/2017 | Rose et al. |
| 9,650,005 B2 | 5/2017 | Patelczyk et al. |
| 9,834,161 B2 | 12/2017 | Mettler |
| 9,878,600 B2 | 1/2018 | Rose et al. |
| 2001/0040383 A1 | 11/2001 | Lund et al. |
| 2002/0079716 A1 | 6/2002 | Espinose |
| 2002/0158460 A1 | 10/2002 | Logan |
| 2003/0184113 A1 | 10/2003 | Espinose et al. |
| 2004/0140664 A1 | 7/2004 | Ward |
| 2004/0189037 A1 | 9/2004 | Espinose et al. |
| 2004/0191475 A1 | 9/2004 | Murayama |
| 2005/0204703 A1 | 9/2005 | Espinose et al. |
| 2005/0217911 A1 | 10/2005 | Cheng |
| 2005/0275212 A1 | 12/2005 | Angelaitis |
| 2006/0181088 A1 | 8/2006 | Cobble et al. |
| 2007/0001480 A1 | 1/2007 | Yamada |
| 2008/0001390 A1 | 1/2008 | Iverson |
| 2008/0217958 A1 | 9/2008 | Banry et al. |
| 2008/0311349 A1 | 12/2008 | Johnson |
| 2010/0007169 A1 | 1/2010 | Nguyen |
| 2010/0115851 A1 | 5/2010 | Nakao |
| 2010/0123324 A1 | 5/2010 | Shoup et al. |
| 2012/0073767 A1 | 3/2012 | Graziano |
| 2012/0144648 A1 | 6/2012 | Iwamoto |
| 2012/0274096 A1 | 11/2012 | Ezaka |
| 2016/0001640 A1 | 1/2016 | Serentill et al. |
| 2017/0001587 A1 | 1/2017 | Mettler |
| 2017/0021786 A1 | 1/2017 | Lee |
| 2017/0355335 A1 | 12/2017 | Patelczyk |

FOREIGN PATENT DOCUMENTS

| | | | |
|---|---|---|---|
| DE | 39 32 142 | 4/1990 | |
| DE | 38 43 803 A1 | 7/1990 | |
| EP | 0447640 A2 * | 9/1991 | ................ B60J 7/22 |
| FR | 1 067 336 A | 6/1954 | |
| FR | 1 096 819 A | 6/1955 | |
| FR | 1 121 035 A | 7/1956 | |
| GB | 73 47 43 A | 8/1955 | |
| GB | 82 91 54 A | 2/1960 | |
| GB | 2 046 183 | 11/1980 | |
| JP | 61-057471 | 3/1986 | |
| JP | 63-130479 | 6/1988 | |
| JP | 2000-296738 A | 10/2000 | |
| JP | 2013-091427 A | 4/2015 | |
| JP | 2013-147169 A | 3/2016 | |

* cited by examiner

VEHICLE HOOD SHIELD AND BRACKET SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure generally relates to vehicle hood shields configured to protect the front end of a vehicle, such as the leading edge of a hood, or a portion of the front fascia of the vehicle.

Description of the Related Art

Numerous types of vehicle hood shields have been developed to protect a vehicle from contact with road debris, bugs, and to deflect airflow away from windshields. These devices are also commonly referred to as bug shields or airflow deflectors. Such devices are described in U.S. Pat. Nos. 4,929,013, 5,112,095, 5,755,483, 6,027,156, 6,752,446, 6,910,316, 7,156,452, and 8,651,554, each of which are hereby incorporated herein in its entirety.

Some vehicle hood shields can cause an excessive amount of hood flutter at high speeds. Additionally, many vehicles are produced in such a manner that hood shields using clips or other fasteners cannot be attached. In some vehicle models where the leading edge of the hood is virtually horizontal, the front fascia of the vehicle needs to be protected instead of the leading edge of the hood. Furthermore, a greater emphasis on fuel economy in vehicle design has led to the need for front end vehicle protection with improved aerodynamics.

SUMMARY

Disclosed herein are embodiments of a hood shield for use on the hood of a vehicle, the hood shield comprising a protection surface facing away from the hood, an attachment surface facing towards the hood, the attachment surface comprising a first adhesive tape section extending along a leading edge of the attachment surface, and a second adhesive tape section extending along a trailing edge of the attachment surface, wherein there is no adhesive tape extending between the leading edge and the trailing edge on sides of the attachment surface, a generally horizontal aerodynamic diverter extending at least partially across a length of the hood shield.

In some embodiments, a leading edge of the hood shield can be configured to wrap around a leading edge of the hood. In some embodiments, the hood shield can be in contact with an underside surface of the hood. In some embodiments, the hood shield may not be in contact with an underside surface of the hood.

In some embodiments, a leading edge of the hood shield can be configured to be spaced from a leading edge of the hood. In some embodiments, the hood shield can be spaced less than 3 mm behind the leading edge of the hood.

In some embodiments, the hood shield can further comprise a third adhesive tape section extending between the first and second adhesive tape sections generally centered on the attachment surface. In some embodiments, the generally horizontal aerodynamic diverter can have a generally triangular cross section. In some embodiments, no clip or brace may be required to attach the hood shield to the hood. In some embodiments, the diverter can extend across an entire length of the hood shield.

In some embodiments, the hood shield can further comprise an attachment clip configured to attach the hood shield to the hood, wherein the attachment clip comprises a first surface in contact with a top side of the hood, a second surface in contact with a bottom side of the hood, wherein the first and second surfaces apply a spring force onto the hood, an attachment surface extending from the first surface, and a snapping attachment pin configured to sandwich the hood shield and the attachment surface. In some embodiments, the attachment clip can further comprise a tab extending from the second surface. In some embodiments, the hood shield can have a contour configuration that follows a contour configuration of the hood.

In some embodiments, the hood shield can further comprise an attachment clip configured to attach the hood shield to the hood, wherein the attachment clip comprises a first surface in contact with an outer side of the hood, a second surface in contact with an inner side of the hood, wherein the first and second surfaces apply a spring force onto the hood, an attachment surface extending from the first surface, and a snapping attachment portion configured to sandwich the hood shield and the attachment surface.

In some embodiments, the attachment clip can further comprise a tab extending from the second surface.

In some embodiments, the hood shield can further comprise an attachment clip configured to attach the hood shield to the hood, wherein the attachment clip comprises a first surface in contact with an outer side of the hood, a second surface in contact with an inner side of a grille, the first surface and second surface being on a same side of the attachment clip, and a snapping attachment portion configured to sandwich the hood shield and the attachment surface, wherein the attachment clip is configured to be held in place by the hood and the grille.

In some embodiments, the hood shield can have a contour configuration that follows a contour configuration of the hood.

Also disclosed herein are embodiments of a bracket for attachment of a hood shield to a vehicle, the bracket comprising a first segment comprising an aperture configured to receive a snapping attachment portion which attaches the hood shield to the first segment, a second segment extending generally transverse from the first segment, a distal flange extending away from the second segment, and a step feature located between the first segment and the second segment.

In some embodiments, the bracket can further comprise a Mylar strip. In some embodiments, the bracket can be configured to be held by a grille and a hood of the vehicle. In some embodiments, the distal flange can be configured to confirm against a lower surface of the grille. In some embodiments, the second segment can be in contact with an inner side of a hood of the vehicle, wherein the first surface and the second surface apply a spring force onto the hood.

DETAILED DESCRIPTION

Disclosed herein are embodiments of vehicle hood shields that can be used on a number of different vehicles to provide protection and/or aesthetic improvements to the vehicles. Vehicles can include cars, trucks, SUVSs, and vans though the particular type of vehicle does not limit the disclosure. Further, embodiments of the disclosed hood shields can be used interchangeably with different types of vehicles, or can be designed specifically for a certain make and/or model of vehicle. As an example, the hood shield can be specifically used for a Chevy Silverado or a Jeep Wrangler.

Figure 1:
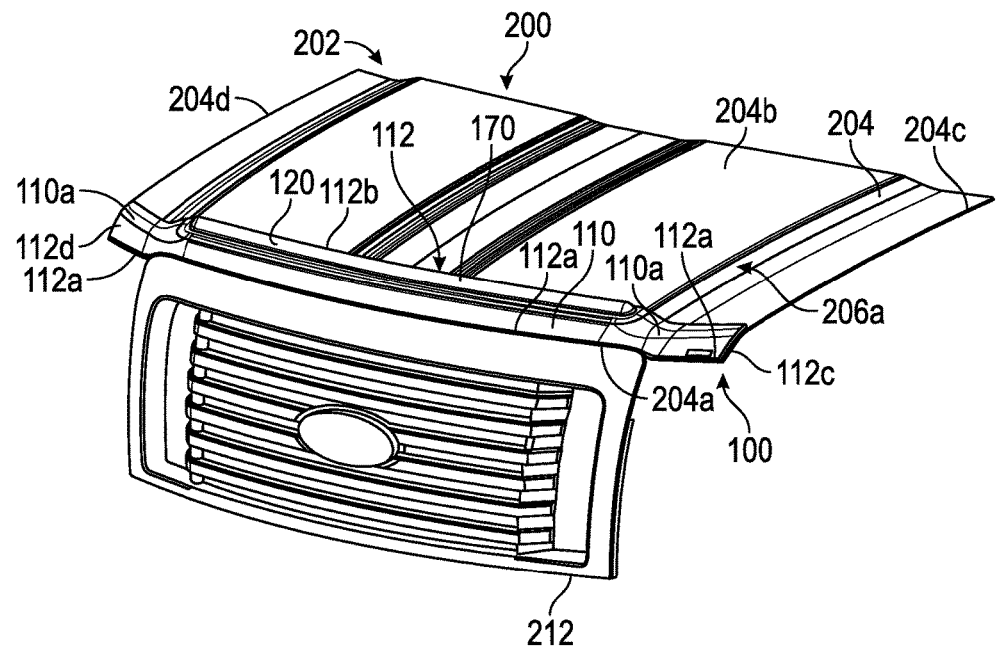
FIGS. 1-3 illustrate an embodiment of a vehicle hood shield attached to a vehicle.
Figure 2:
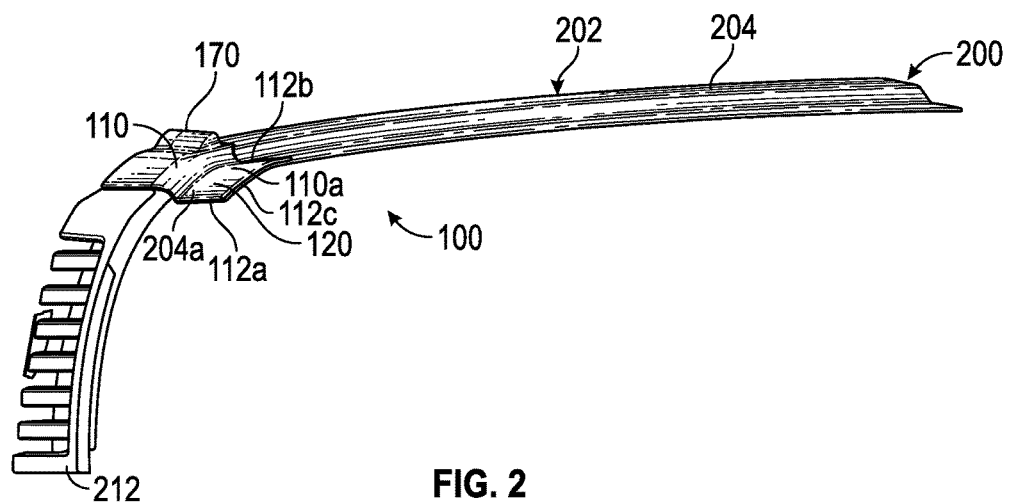
Figure 3:
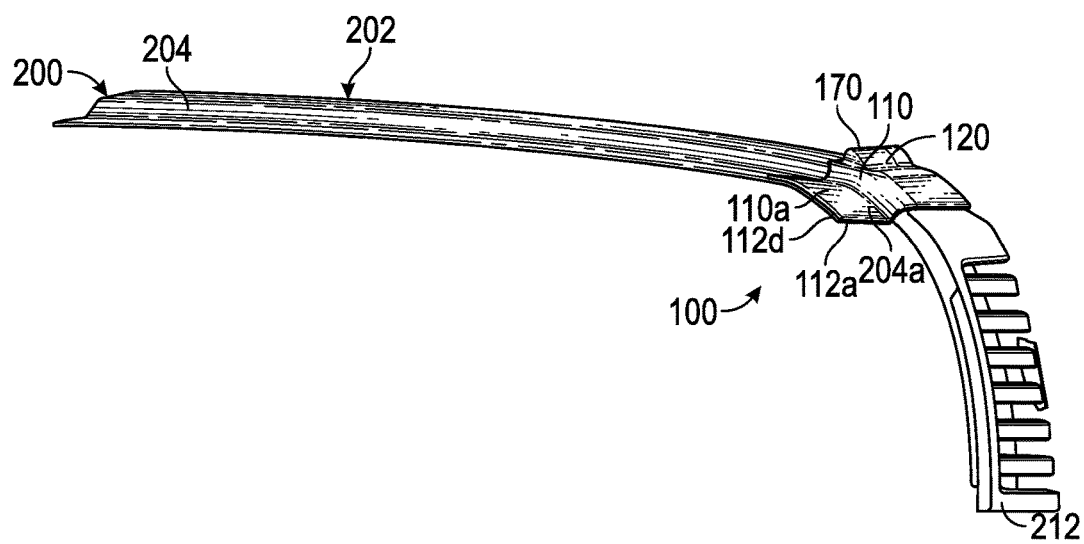

FIG. 1 illustrates an embodiment of a hood shield 100 for protecting the exterior surface 202 of a vehicle 200. When a vehicle is driving at a high rate of speed, debris can strike and damage the front end of the vehicle. Those surfaces of the front end of the vehicle 200 that are at an angle to the road are the most vulnerable because the potential impact angle from debris is the greatest. In some cases, this area is the leading edge 204a of the vehicle's hood 204, and in others it is the front fascia of the vehicle 200. Certain embodiments of the disclosed vehicle hood shield 100 is designed to protect these areas of the vehicle 200. Accordingly, disclosed herein are embodiments of a hood shield 100 where the hood shield 100 is attached to the hood 204 of the vehicle 200.

As shown in FIG. 1, vehicle 200 has an exterior surface 202 that extends across a hood 204, a front fascia, and a front grille 212. The hood 204 has a leading edge 204a and a contoured surface configuration 204b. Hood 204 also has a first side edge 204c and a second side edge 204d separated by a width, $W_H$. Front fascia also has a contoured surface configuration 206a. In some cases, the front grille 212, the front fascia, or the hood 204 may have an emblem. While many vehicle hoods are similar in shape to what is described above, it will be understood that the particular shape of the hood does not limit the disclosure.

Figure 4:
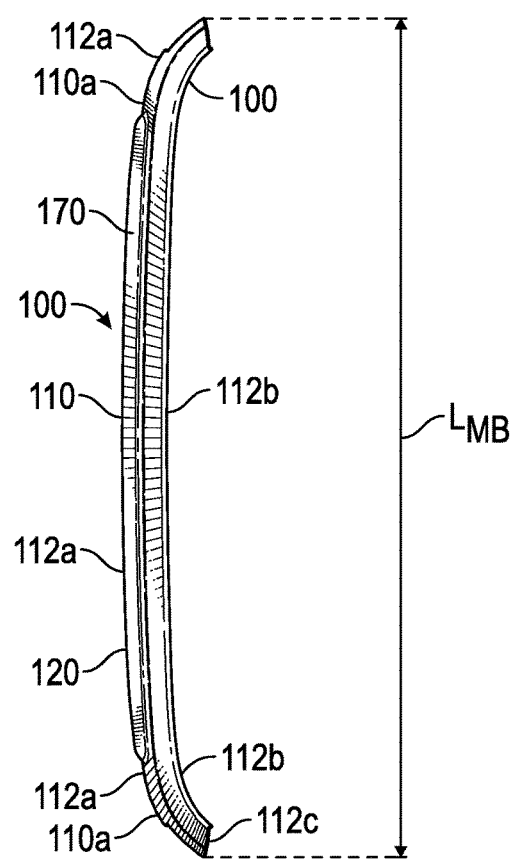
FIG. 4 illustrate a front view of an embodiment of a vehicle hood shield.

One aspect of vehicle hood shield 100 is the main body 110. As shown in FIG. 4, main body 110 has a length, $L_{MB}$ and an outer periphery 112 defined by a leading edge 112a, a trailing edge 112b, a first side edge 112c and a second side edge 112d. The main body 110 also has side portions 110a near the first and second side edges, 112c and 112d, though in some embodiments the side portions are not included. Length, $L_{MB}$ extends from the first side edge 112c to the second side edge 112d. When attached to a vehicle 200, the leading edge 112a of the main body 110 can be the forwardmost part of the vehicle hood shield 100 wherein the trailing edge 112 can be the rearwardmost part of the vehicle hood shield 100. The outer periphery 112 can define a first side comprising a protection surface 120. Protection surface 120 is the portion of vehicle hood shield 100 that faces away from the vehicle exterior surface 202 so as to protect the exterior surface 202 from damage by debris. Opposite the protection surface 120, and separated by a thickness is a first side comprising an attachment surface 130 (FIGS. 5A-B) to which an attachment system 150, discussed later, is connected. Both the protection surface 120 and the attachment surface 130 can have contour configurations 122, 132, shown in FIG. 6 respectively, that are shaped to follow the contoured surface configuration 204b of the hood 204 or the contoured surface configuration 206a of the front fascia. As such, the protection surface 120, the attachment surface 130, and the portion of the vehicle 200 exterior 202 to which the vehicle hood shield 100 is attached, are generally equidistant from each other.

In some embodiments, the protection surface contour configuration 122 and the attachment surface contour configuration 132 are generally equidistant from each other as thickness, as the thickness can be substantially constant throughout the main body 110. It should be noted that the vehicle hood shield main body 110 can have a pre-molded contoured shape which is in contrast to an article that is simply a planar, thin material that naturally takes the shape of the surface on which it is placed. Additionally, the contoured shape of the main body 110 in many embodiments is generally symmetrical from the leading edge 112a to the trailing edge 112b throughout the majority of the length, $L_{MB}$, of the main body 110. However, nearer to the side edges 112c, 112d, at the side portions 110a of the main body 110, the contoured shape often changes to accommodate the changing contour of the vehicle exterior surface 202. As can be appreciated, the contoured shape of the main body 110 can vary significantly throughout the length, $L_{MB}$ and does not have to result in a constant cross-sectional shape.

In some embodiments, the hood shield main body 110 can contain an aerodynamic diverter (or raised portion) 170 extending along the length of the protection surface 120. The diverter The diverter 170 can extend fully or partially across the length of the main body 110. In some embodiments, the diverter 170 can extend over approximately 75, 80, 85, 90, 95, or 100% of the length of the main body. In some embodiments, the diverter 170 can extend over greater than approximately 75, 80, 85, 90, 95, or 100% of the length of the main body. In some embodiments, the diverter 170 can extend over less than approximately 75, 80, 85, 90, 95, or 100% of the length of the main body. In some embodiments, the diverter 170 can extend about 0.25, 0.5, 0.75, 1, 1.25, 1.5, 1.75, 2.0, 2.25, 2.5, 2.75, or 3 inches above the contoured configuration 132. In some embodiments, the diverter 170 can extend less than about 0.25, 0.5, 0.75, 1, 1.25, 1.5, 1.75, 2.0, 2.25, 2.5, 2.75, or 3 inches above the contoured configuration 132. In some embodiments, the diverter 170 can extend greater than about 0.25, 0.5, 0.75, 1, 1.25, 1.5, 1.75, 2.0, 2.25, 2.5, 2.75, or 3 inches above the contoured configuration 132. As shown in the figures, the diverter 170 can be generally centered on the vehicle hood 204. Further, the diverter 170 can extend the same distance above the contour configuration 132 along the width of the diverter 170. The diverter 170 can provide for improved aerodynamics, thus reducing fuel consumption during long drives. Further, the diverter 170 may deflect air downwards passed the diverter 170 to press the trailing edge 112b of the hood shield 100 against the hood 204.

Figure 5:
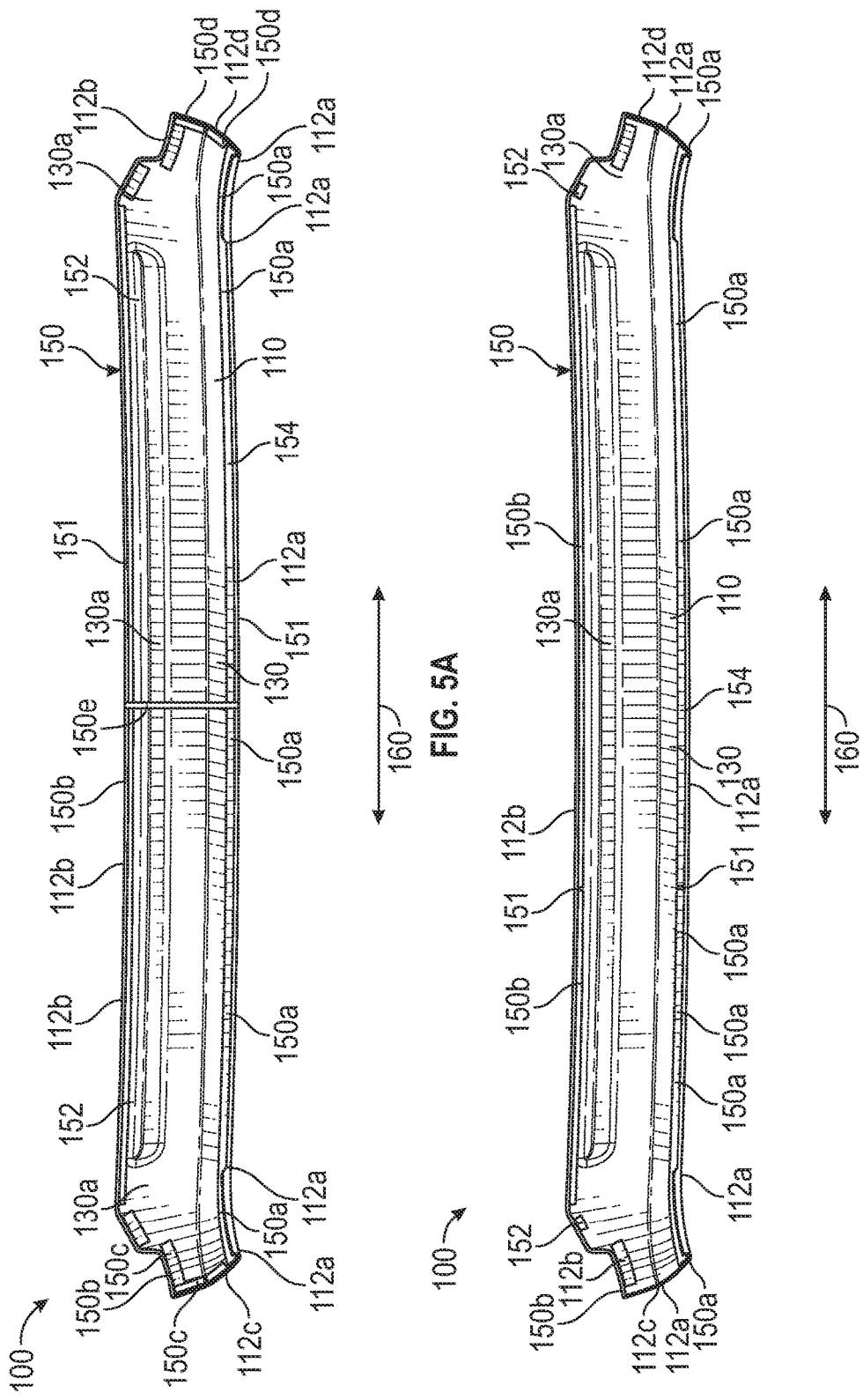
FIGS. 5A-B illustrate views of different attachment surface of a vehicle hood shield.

Another aspect of vehicle hood shield 100, is attachment system 150, shown in FIGS. 5A-5B. As stated previously, the attachment system 150 is for bonding the main body 110 of the vehicle hood shield 100 to the exterior surface 202 of the vehicle. Many types of attachment systems are suitable for this purpose. In some embodiments, and as best seen at FIGS. 5A-B, attachment system 150 can include first, second, third and fourth adhesive tape sections, 150a, 150b, 150c, and 150d, respectively. Each of the tape sections 150a-d can comprise a single length of tape or multiple lengths of tape. Also, each of the adhesive tape sections can have a thickness and a tape liner 154 for preserving and protecting the adhesiveness of the tape sections up to the point that the vehicle hood shield 100 is to be installed. Attachment system 150 can also have pads 152, for example rubber pads, disposed on the attachment surface 130 to provide support for the vehicle hood shield 100 at points where there is no adhesive tape section in order to prevent the hood 204 of the vehicle from becoming scratched.

In some embodiments, the first adhesive tape section 150a can be arranged proximate the leading edge 112a of the vehicle hood shield 100 while the second adhesive tape section 150b can be arranged proximate to the trailing edge 112b of the vehicle hood shield 100. The third and fourth adhesive tape sections, 150c and 150d, are shown as being proximate to the first and second side edges 112c, 112d, respectively. Thus, in the arrangement shown, the majority of the attachment surface 130, and the entire central portion 130a of the attachment surface 130 is not covered by the adhesive tape sections. However, one skilled in the art will appreciate that more or fewer adhesive tape sections may be used in various arrangements. For example, in some embodiments an additional piece of adhesive tape 112e can be used to connect the tape sections 150a, 150b generally at the center of the attachment surface 130.

In some embodiments of the attachment system 150, tape sections 150a and 150b can be each oriented to define a channel or cut at about the midpoint of main body 110. This cut can be formed by cutting away tape section lengths or by leaving a gap between tape section lengths. The cut allows for moisture that may have gathered along the tape sections 150a, 150b to drain away from the main body 110. In some embodiments, a channel can be about 0.25 inch, though the particular dimension does not limit the disclosure. Additionally, between the individual tape lengths of the tape sections allow for moisture vapor to escape and thereby help to prevent undesirable condensation from forming on the attachment surface 130 of the main body 110.

In some embodiments, adhesive tape sections 150c and 150d are not used, as shown in FIG. 5B. FIG. 5B shows a configuration for attachments system 150 wherein the first and second side edges 112c, d of the main body 110 contain no adhesive tape sections extending along the first and second edges 112c, 112d between the first and second adhesive tape sections. In some embodiments, it has been discovered that attachment system 150 can provide better adhesion performance through multiple thermal expansion/contraction cycles when tape sections at the ends 112c, 112d of the main body 110 are not used. In general, main body 110 will expand and contract a greater distance from end 112c to end 112d in direction 160, as compared to expansion occurring in a direction from the leading edge 112a to the trailing edge 112b. Direction 160 is also the general lengthwise direction of the main body 110 and parallel to length $L_{MB}$. As a consequence of thermal expansion, main body 110 exerts a force upon the adhesive tape sections of the attachment system 150 along direction 160. This force can cause adhesive tape sections to become detached from the hood 204. Adhesive tape sections extending from the leading edge 112a to the trailing edge 112b and located at the ends 112c, 112d of the main body 110 are especially prone to detachment due to the fact that they are oriented generally perpendicular to the direction of force 160. By use of the term "generally perpendicular," it is meant to include orientations that are greater than 45 degrees from the direction of force 160. As shown in FIGS. 5A-B, ends 112c, 112d can be about 80 degrees from direction 160 though the particular angle is not limiting. In some embodiments, the angle can be about 40, 50, 60, 70, 80, 90, 100, 110, or 120 degrees. In some embodiments, the angle can be less than about 40, 50, 60, 70, 80, 90, 100, 110, or 120 degrees. In some embodiments, the angle can be greater than about 40, 50, 60, 70, 80, 90, 100, 110, or 120 degrees.

In some embodiments, where adhesive tape sections at the ends 112c, 112d have sufficient strength to remain attached, the main body 110 can buckle during thermal expansion as the adhesive tape sections can physically prevent the ends from moving when the rest of the main body 110 is expanding. As such, it can be beneficial to configure attachment system 150 such that ends 112c and 112d of the main body 110 are free from generally perpendicular adhesive tape sections. It is noted that the particular embodiments shown in FIGS. 5A-B does have some tape sections 150a at the leading edge 112a that are generally perpendicular to the lengthwise direction of the main body 110. While these tape sections could be removed for greater thermal expansion performance, it has been found that the overall adhesive performance is enhanced as the main body 110 must be secured to the hood 204 as the main body wraps around the front grill 212. Additionally, thermal expansion is not as severe of an issue as is present at the ends 112c, 112d of the main body 110. It is also noted that these generally perpendicular tape sections are shown on the outermost portions of the main body 110 for a distance from the ends 112c, 112d at least equal to or greater than the distance between the leading and trailing edges of the main body 110.

In some embodiments, instead of using continuous lengths of adhesive tape, two separate lengths of tape can be used on each side and separated from pads 152. As can be seen at FIG. 1, the main body 110 has an aggressively shaped contour with highly radiused curves at the general location of pads 152. In locations such as these, the tape sections can have difficulty following the contours while still maintaining good adhesion performance. As such, using multiple tape sections 150b in these areas, in conjunction with pads 152, can result in better adhesion performance while ensuring that hood 204 remains protected from the main body 110. FIG. 5B also shows an embodiment of an arrangement of multiple lengths of tape sections 150a used for the generally perpendicular lengths that wrap downwardly along the front grill 212 of the hood. It has been found that using multiple sections in areas typical of this provide enhanced adhesion performance.

The particular adhesive used in the embodiments shown can be a double-sided automotive grade foam core acrylic tape from the 3M Corporation (model 5390), though the particular tape does not limiting the disclosure. The tape can be approximately 2 millimeters thick and 8 millimeters wide, although other thicknesses and widths may be used. For example, the tape sections could be less than 1 millimeter thick and up to 5 millimeters, or more thick. The width could also be less than 1 millimeter wide and up to the width of the main body 110, depending on the configurations of the tape sections. Through the use of attachment system 150, it should be appreciated that vehicle hood shield 100 can be configured such that no part of the main body 110 of the vehicle hood shield 100 comes into contact with the exterior surface 202 of the vehicle 200.

Figure 6:
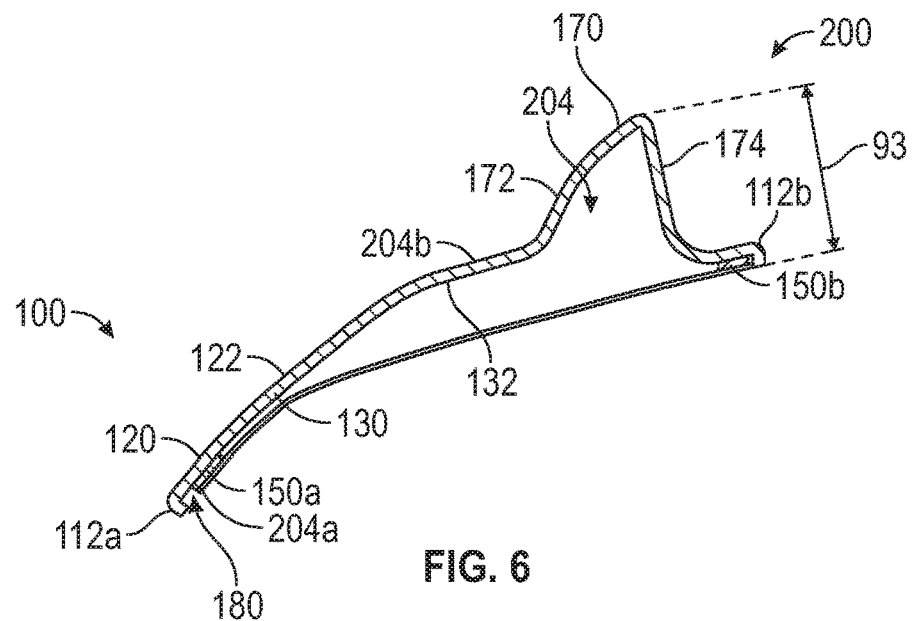
FIGS. 6-7 illustrate cross-sectional views of an embodiment of a vehicle hood shield.
Figure 7:
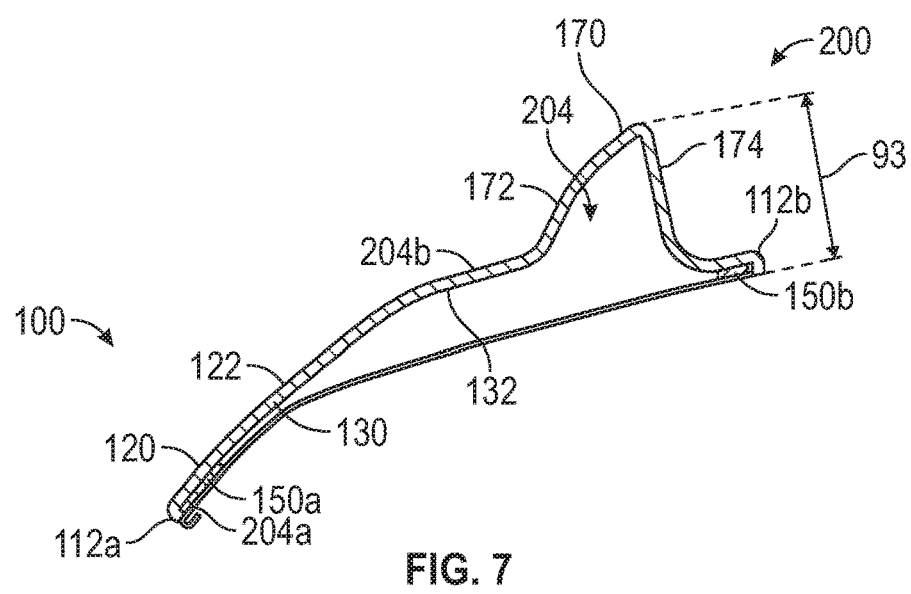
Figure 8:
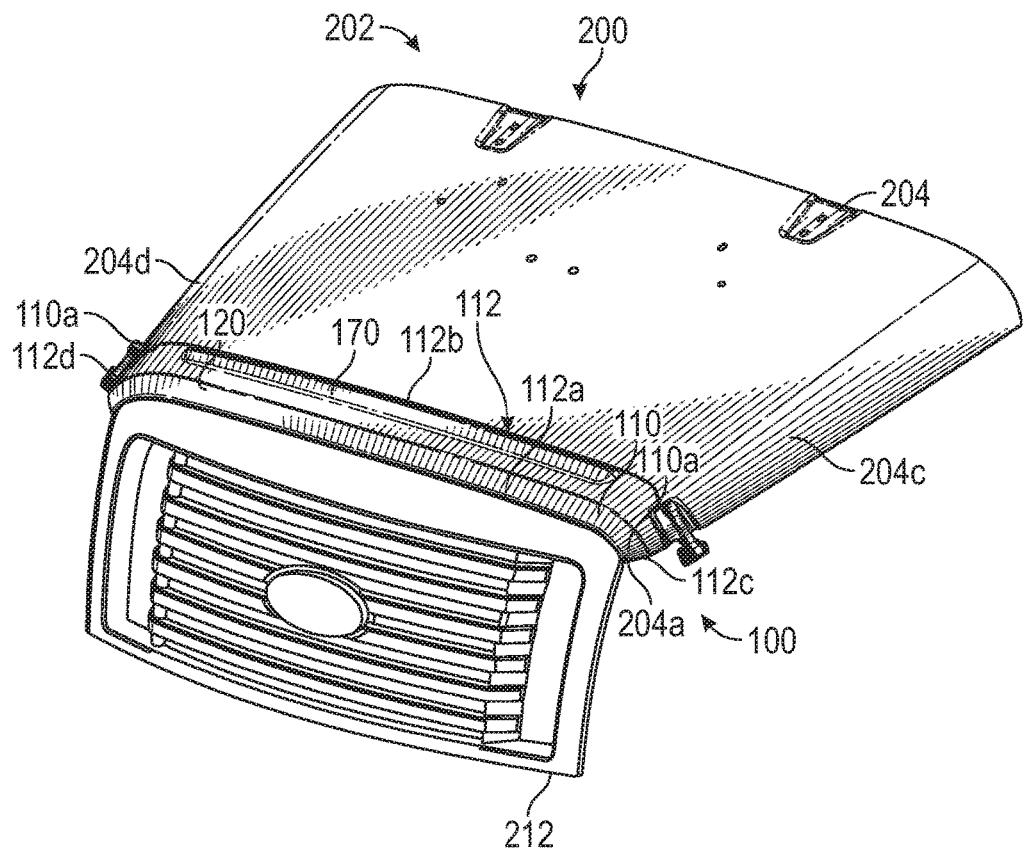
FIGS. 8-10 illustrate an alternate embodiment of a vehicle hood shield attached to a vehicle.
Figure 9:
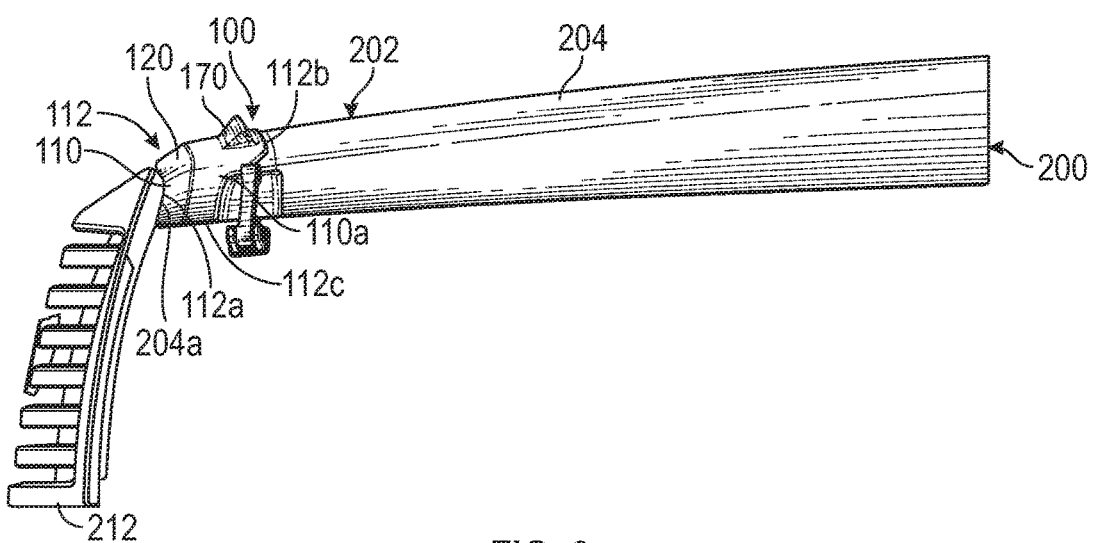
Figure 10:
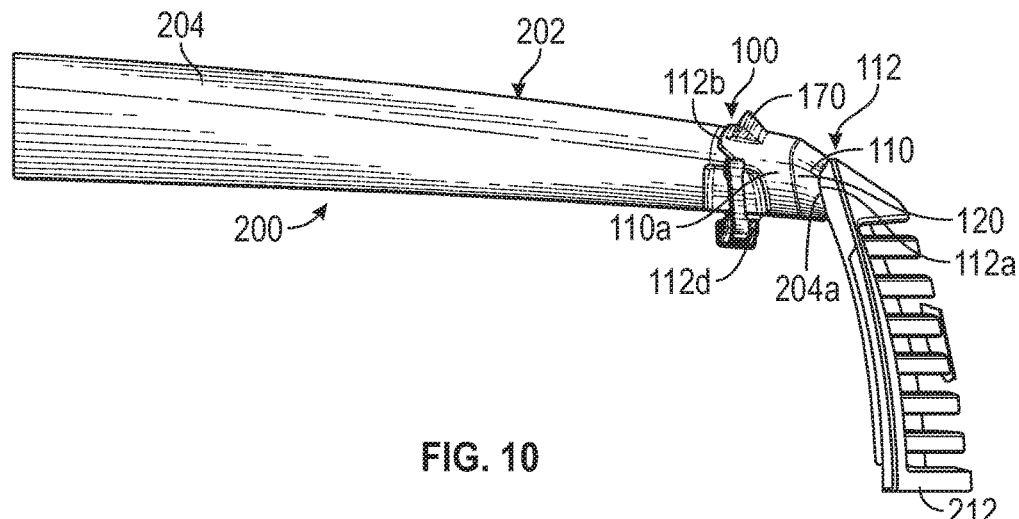
Figure 11:
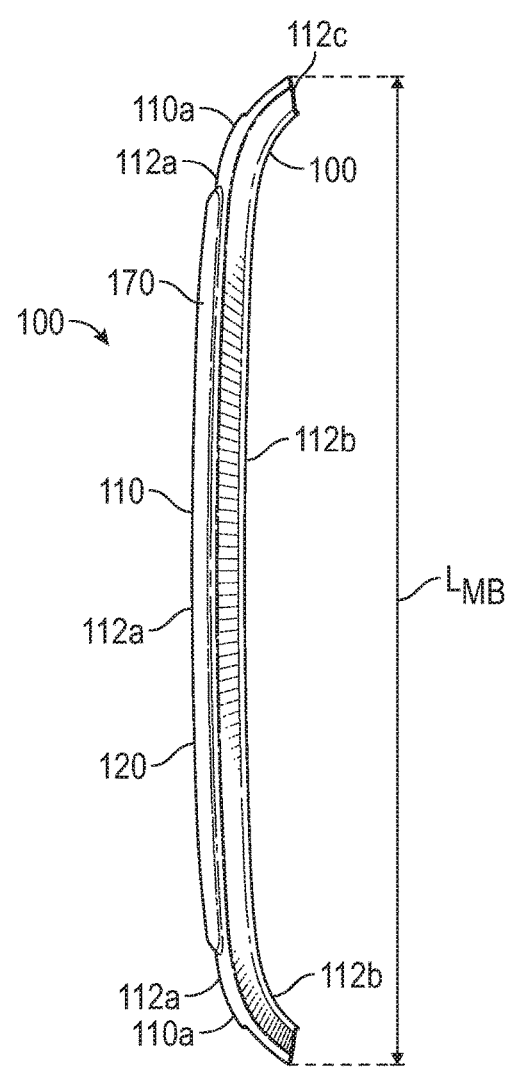
FIG. 11 illustrates a front view of the alternate embodiment of a vehicle shield.
Figure 12A:
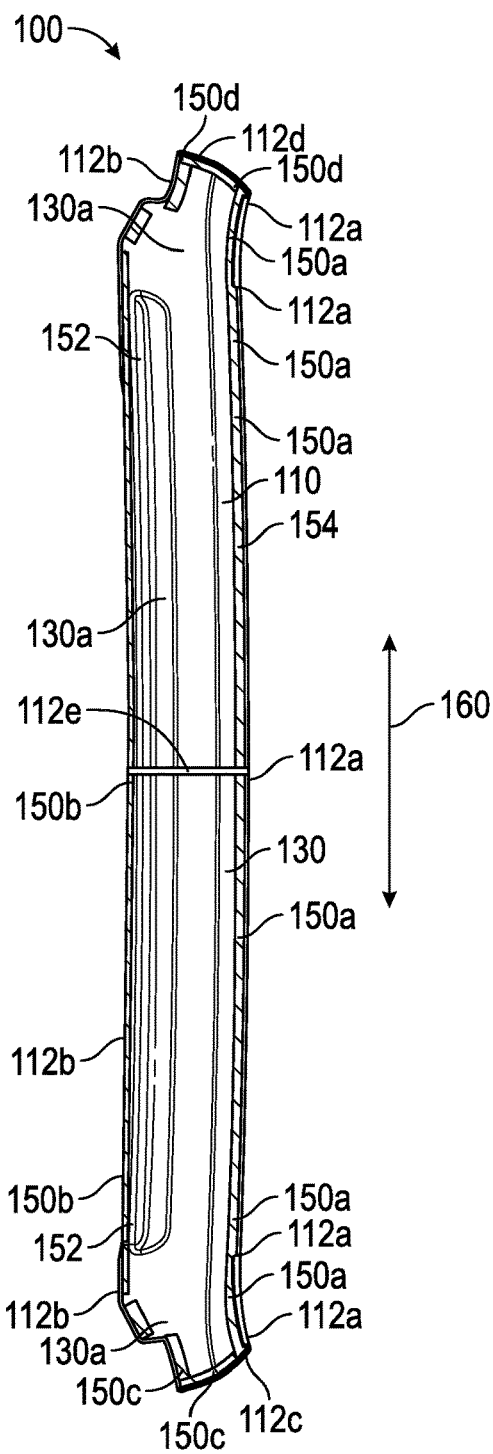
FIG. 12A illustrates a view of an attachment surface of the alternate embodiment of a vehicle shield.
Figure 12B:
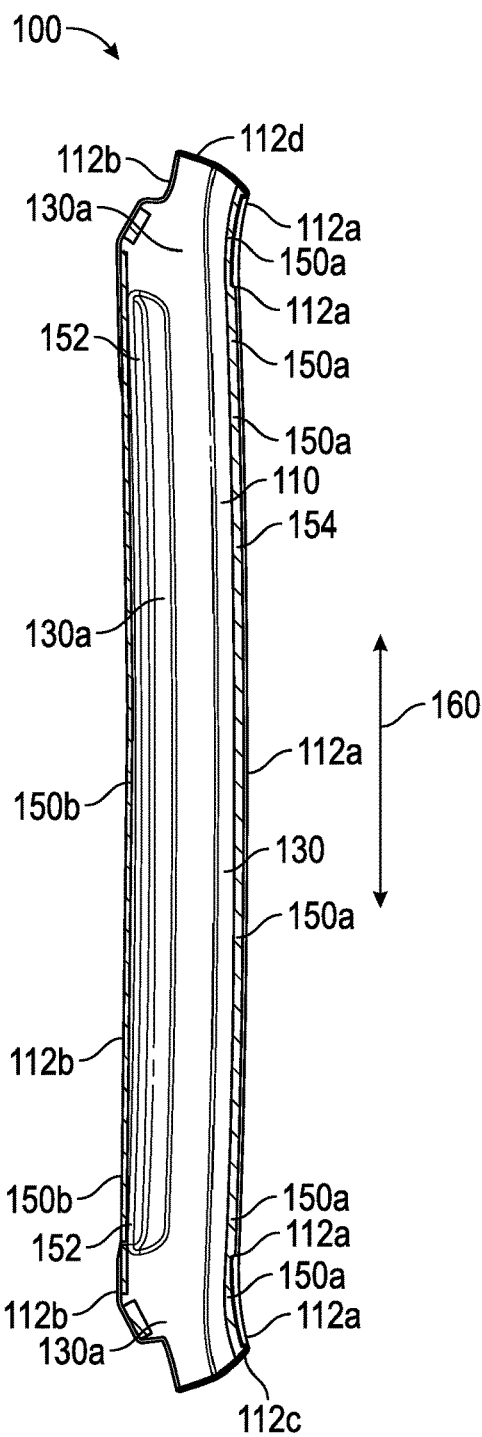
FIG. 12B illustrates a view of an attachment surface of the alternate embodiment of a vehicle shield.

FIGS. 6 and 7 illustrate two different configurations of embodiments of a vehicle hood shield 100 in cross-section generally down the middle of the vehicle hood shield 100. Specifically, FIG. 6 illustrates an embodiment where the leading edge 112a of the hood shield 100 passes over the edge of the hood 204. Thus, there can be a gap or lip 180 formed between the attachment surface 130 of the leading edge 112a and the edge of the hood 204. Thus, the hood shield 100 may be considered to "wrap around" the front edge of the hood 204. The lip having edge depth can aid in concealing the attachment system 150 from view once the vehicle hood shield 100 has been installed on the vehicle 200. Furthermore, edge depth can increase the aerodynamic properties of the vehicle hood shield 100 by directing airflow over the protection surface 120. Also, the leading edge 112a of the hood shield 100 could wrap around the inside surface of the hood 204 in some embodiments, thereby partially sandwiching the hood 204 between parts of the hood shield 100. In some embodiments, an internal surface of the lip 180 generally opposite the leading edge 112a of the hood shield 100 can be in contact with the leading edge 204a of the hood 204, thus removing any gap between the lip 180 and the leading edge 204a of the hood 204.

FIG. 7 illustrates an alternate configuration of the leading edge 112a of the hood shield 100. As shown, the leading edge 112a of the hood shield 100 does not "wrap around" the front edge of the hood 204. Instead, the leading edge 112a of the hood shield 100 is approximately the same as the front edge of the hood 204. This allows the hood shield to be used for vehicles that do not have any space to wrap around, as many new vehicle designs use gaskets or more closely connected surfaces. While FIG. 7 shows the leading edge 112a extending to the edge of the hood 204, it will be understood that the leading edge 112a could be set back slightly from the front edge of the hood 204. For example, in some embodiments the leading edge 112a could be set back approximately 1, 2, 3, 4, 5, 6, 7, 8, 9, or 10 mm from the front edge of the hood 204. In some embodiments the leading edge 112a could be set back greater than approximately 1, 2, 3, 4, 5, 6, 7, 8, 9, or 10 mm from the front edge of the hood 204. In some embodiments the leading edge 112a could be set back less than approximately 1, 2, 3, 4, 5, 6, 7, 8, 9, or 10 mm from the front edge of the hood 204. This makes the hood shield 100 easier for a user to apply, as the hood shield 100 does not have to be placed in the exact correct location, and some misplacement will be tolerated. Further, if the hood shield 100 experiences thermal expansion, such as on a hot day, it will not extend over the edge of the hood.

In addition, both FIGS. 6 and 7 illustrate a cross-sectional view of the aerodynamic diverter 170 mentioned above. As shown, the diverter 170 can extend away from the hood 204 to form a triangular shaped cross section using two different legs 172/174. Leg 172 can be longer than leg 174 in some embodiments, thus forming a front surface obtuse between the diverter 170 and the front of the vehicle hood shield 100 that allows air to flow over the diverter 170, providing improved aerodynamics. Further, the diverter 170 can be located near the back of the vehicle hood shield 100, though the particular location of the diverter 170 does not limit the disclosure. The diverter 170 can have a maximum height 93, and the particular height does not limit the disclosure.

Once the vehicle hood shield 100 has been installed, the protection surface 120 is located at a standoff height above the exterior surface 202 of the vehicle 200. For example, the standoff height can be approximately the sum of the adhesive tape section thickness and the main body thickness. In the case that the main body 110 edges are rolled, edge depth can be slightly less than the height such that the adhesive tape sections project away from the attachment surface 130 sufficiently to reach the hood 204 or front fascia of the vehicle 200. Or stated another way, the minimum thickness of the adhesive tape sections, $T_{AS}$, is at least the same or exceeds the edge depth. Because the vehicle hood shield has a contoured shape 122, 132, that follows the contoured shape of the vehicle hood 204 or the front fascia, the standoff height can be relatively constant across the main body 110 outside of the diverter 170. In some embodiments, this configuration will result in the standoff height at any point along the main body outside of the diverter 170 as being less than 0.25 inches. Because of this low standoff height, it should be appreciated that substantial protection to the hood 204 or front fascia can be obtained with minimal impact on the aerodynamics of the vehicle, while also achieving improved vehicle aesthetics with the disclosed low profile design of the vehicle hood shield 100. Furthermore, it should also be appreciated that the aerodynamic low profile design of vehicle hood shield 100 will reduce the likelihood of excessive hood flutter while driving at high speeds.

As stated previously, the main body 110 has a length, $L_{MB}$. In the case where the vehicle hood shield 100 is mounted to the hood 204 of a vehicle 200, the main body length, $L_{MB}$ can be sized to substantially match the leading edge width of the hood 204 which is defined by the front side edges of the hood. However, it should be understood that the main body 110 can be slightly inset from the side edges of the hood to ensure proper clearances. In most embodiments, the length of the main body is at least as long as a majority of a width of a leading edge of the vehicle hood for which the vehicle hood shield is adapted. Additionally, the leading edge 112a of the main body 110 can have an edge profile that matches the edge profile of the leading edge 204a of the hood 204. By use of the term "edge profile" it is intended to mean the outline of the hood or main body leading edge when viewed from a top perspective. In the event that the vehicle 200 has an emblem that may interfere with the installation of the vehicle hood shield 100, an aperture can be provided in the main body 110 for the emblem. Where the main body 110 is attached to the front fascia of a vehicle 200, the length, $L_{MB}$, of the main body 110 can be formed as desired to ensure proper protection and aesthetic appearance.

FIGS. 8-12B illustrate another configuration of a hood shield 100. While the design may be slightly different than what was shown in the previous figures, it will be understood that the general disclosure above of the different features of the previous hood shield 100 also applies to these embodiments. Accordingly, figure numbering has been left the same for clarity.

The main body of shield 100 may be made from a variety of materials, such as acrylic, ABS plastic, or other suitable materials, and the particular material does not limit the disclosure. However, one skilled in the art will appreciate that other materials may be used without departing from the concepts presented herein. These materials allow for the main body 110 to be permanently molded into virtually any contoured shape that will complement the contoured shape of a vehicle hood 204, the front fascia, or the fenders. Typical thicknesses for the main body 110 materials are 0.085 inch and 0.1 inch. The thickness of the material can be less than 0.085 inch, such as 0.05 inch and can be more than 0.1 inch, such as 0.15 inch or 0.25 inch. These thicknesses give the main body 110 sufficient structural integrity to retain their molded contour and shape, once formed. The protection surface can also be given a smoke appearance or have a chrome or painted finish. In the case of chrome or painted finishes, this can be accomplished through the application of a film onto the protection surface 120.

Installation

To install the vehicle hood shield 100, the above described vehicle hood shield 100 can be positioned over the exterior surface 202 of the vehicle 200. The vehicle hood shield can then be aligned with the appropriate structure on the vehicle 200, for example the leading edge 204a and the side edges 204c, 204d of the hood 204. Once aligned, the adhesive tape liner 154 can be removed from the adhesive tape sections, 150a-150d. Subsequently, pressure can be applied to the protection surface 120 of the main body 110 in the direction of the attachment surface 130 such that the adhesive tape sections, 150a-150d, or any combination thereof if some sections are removed, fully engage the exterior surface 202 of the vehicle 200. Once the vehicle hood shield 100 has been installed, a protective film covering that can be shipped on the protective surface can be removed. One skilled in the art will appreciate that no tools are required for such an installation, and that no part of the vehicle hood shield 100 extends below the hood 204, or any other part of the vehicle in order to ensure a secure connection to the vehicle 200. Furthermore, it should be appreciated that this type of vehicle hood shield 100 can be installed on any type of vehicle, even those which are not able to accept a traditional vehicle hood shield requiring clips or fasteners.

Attachment Clip

Figure 13:
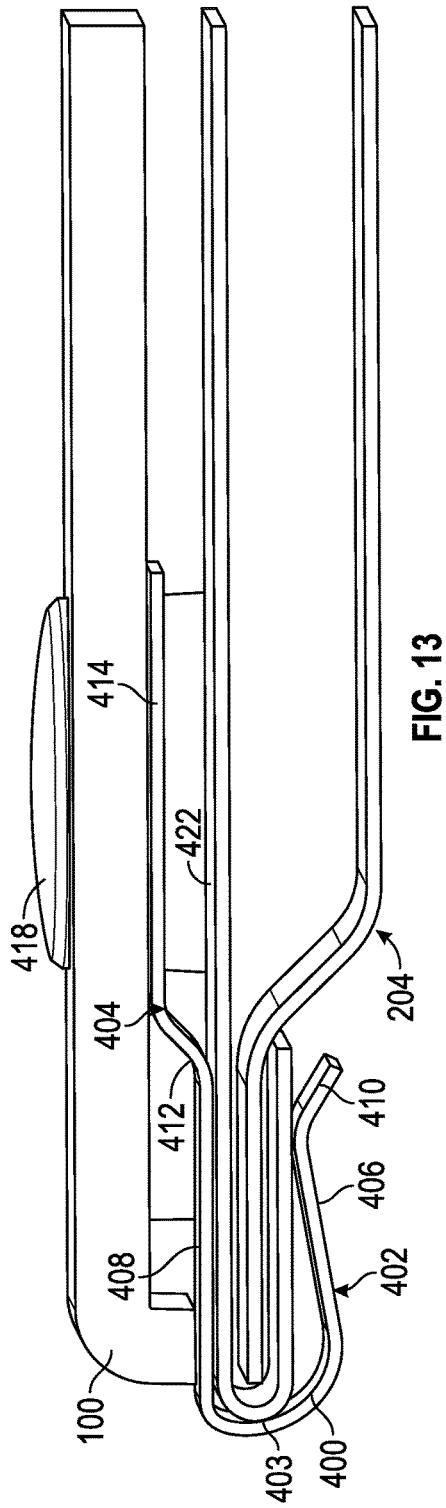
FIG. 13 illustrates an embodiment of an attachment clip attaching a vehicle hood shield to a vehicle hood.
Figure 14:
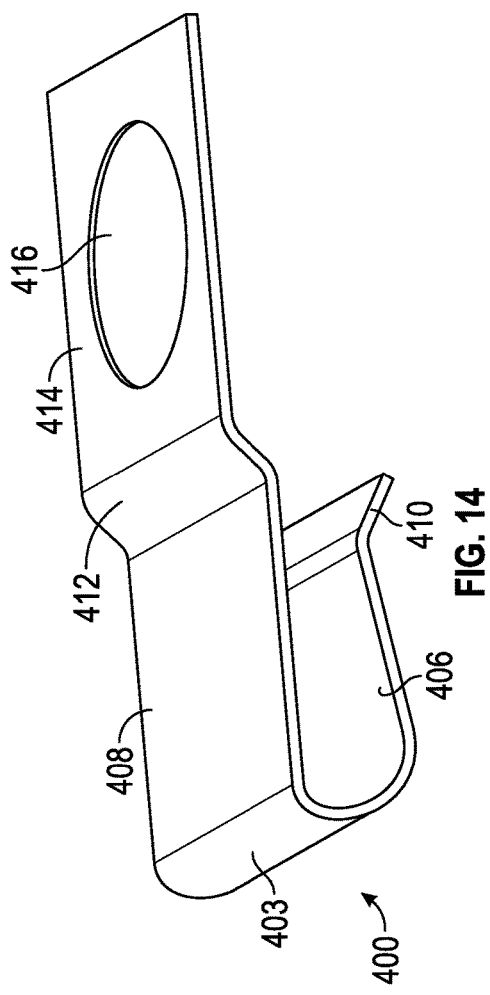
FIG. 14 illustrates an embodiment of an attachment clip.

While the above disclosed embodiments of the vehicle hood shield 100 can be attached to the vehicle 200 through the use of only adhesive tape as discussed above, embodiments of the vehicle hood shield 100 can also be attached to the vehicle 200 through the use of an attachment clip (or bracket) 400, shown in FIGS. 13-14. The attachment clip 400 can be used instead of, or in conjunction with, the adhesive tape discussed above.

FIG. 13 shows the attachment clip 400 attached to the hood shield 100 and vehicle 200, whereas FIG. 14 shows the attachment clip 400 on its own. As shown, the attachment clip 400 generally conforms to the hood 204.

The attachment clip 400 can include a clip portion 402 and an attachment portion 404. The clip portion 402 is configured to fold over itself at turn 403 to surround the end of the hood 204. Thus, as shown, the lower segment 406 can provide a spring force towards the upper segment 408 and vice versa, holding the attachment clip 400 on the hood 204 in the proper location. The lower segment 406 can further include a tab 410 extending downwards (e.g., away from hood 204), in which a user can grip to pull the attachment clip 400 off the vehicle 200.

The upper segment 408 can be generally flat/planar. Opposite the turn 403, the upper segment 408 can include a step feature 412 that extends upwards away from the hood 204. Following the step feature 412 is the attachment segment 414, which can also be generally flat/planar. In some embodiments, the attachment segment 414 and upper segment 408 can be generally parallel to one another, but this does not limit the disclosure. The attachment segment 414 can include an aperture 416 generally centered on the attachment segment 414. The aperture 416 can be generally circular, though the particular dimensions does not limit the disclosure.

Figure 15:
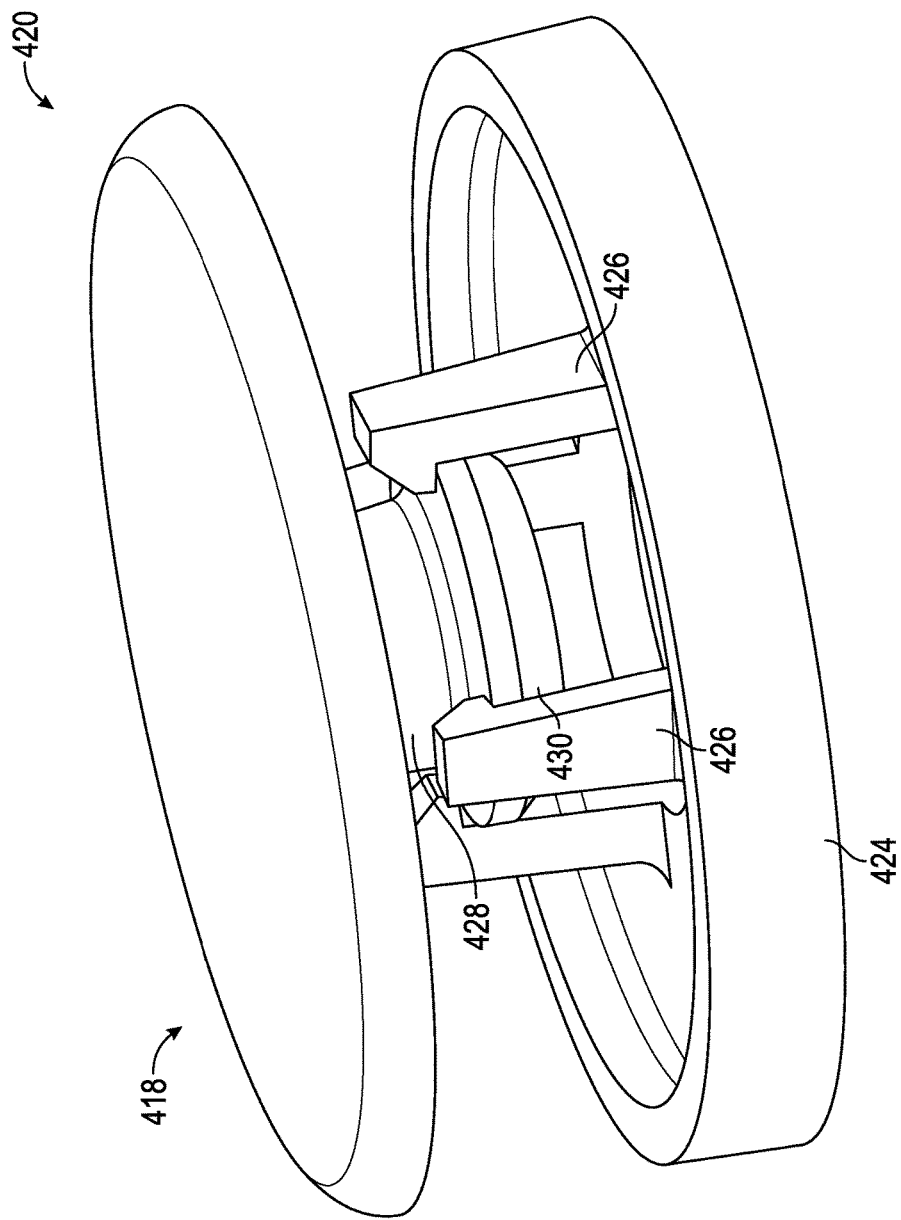
FIG. 15 illustrates an embodiment a snapping mechanism for an attachment clip.

The aperture 416 can be sized to fit a pin 418 which can include a separable head 420 and base 424, both of which can be greater in size than the aperture 416. The head 420 and base 424 can include a snapping mechanism, as shown in FIG. 15. As shown, the base 424 can contain a number of arms 426 (for example 2, 3, 4, 5, 6, or 7) extending towards the head 420. Further, the head 420 can include a thinner segment 428 and a bulbous end 430. The arms 426 are configured to at least partially surround the bulbous end 430 as shown in FIG. 15, creating a snapping mechanism. However, other types of attachment mechanisms can be used, and the particular design does not limit the disclosure.

Accordingly, as shown in FIG. 13, the pin 418 is configured to sandwich the vehicle hood shield 100 against the attachment clip 400, thus preventing motion of the vehicle hood shield 100 with respect to the hood 204. Further, in some embodiments a Mylar film 422, or other protective film can be used on the top of the hood 204 to protect it from being scratched by any parts of the attachment clip 400.

Embodiments of the disclosed attachment clip 400 may have numerous advantages over those in the art. For example, the attachment clip 400 for attachment, and does not require a mechanical fastener. Further, the snapping feature of the pin 418 is an improvement over typical clips using threaded screws. Additionally, a portion of the attachment clip 400 conforms to the vehicle hood 204 thereby locating the attachment clip 400 for the vehicle hood shield 100, whereas typical clips require a hole in the hood to locate the clip for any shield.

Moreover, as the disclosed attachment clip 400 is a "floating design", this allows for a significantly more tolerance for misalignment of the attachment clip 400 and vehicle hood shield 100 than a typical clip. Along with this, the attachment clip 400 can be located at any point on the hood 204 and is not dependent on the underside profile of the hood 204. Additionally, there are no requirements for tools when installing the attachment clip 400, the attachment clip 400 does not require the use of any spacers, and no torque fasteners are required. Further, the attachment clip 400 does not require any clearance around the hood 204 as the attachment clip 400 is in direct contact with the hood 204.

FIGS. 16-20 illustrate further embodiments of an attachment clip 500 which can be used to attach the hood shield 100 to the hood 204. The attachment clip 500 can be used instead of, or in conjunction with, the adhesive tape discussed above. As shown, the attachment clip 500 generally conforms to the hood 204 and/or the grille 212.

Figure 16:
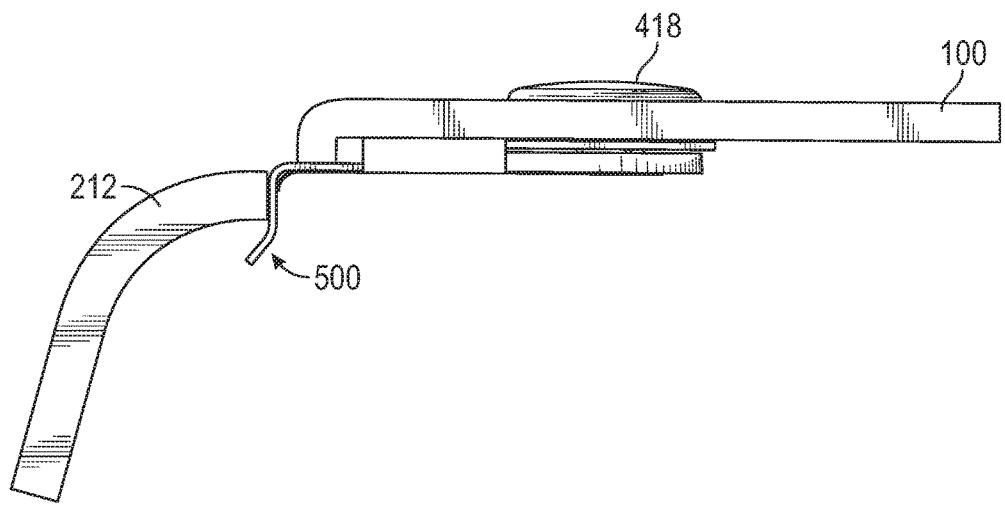
FIGS. 16-19 illustrate an embodiment of an attachment clip.
Figure 17:
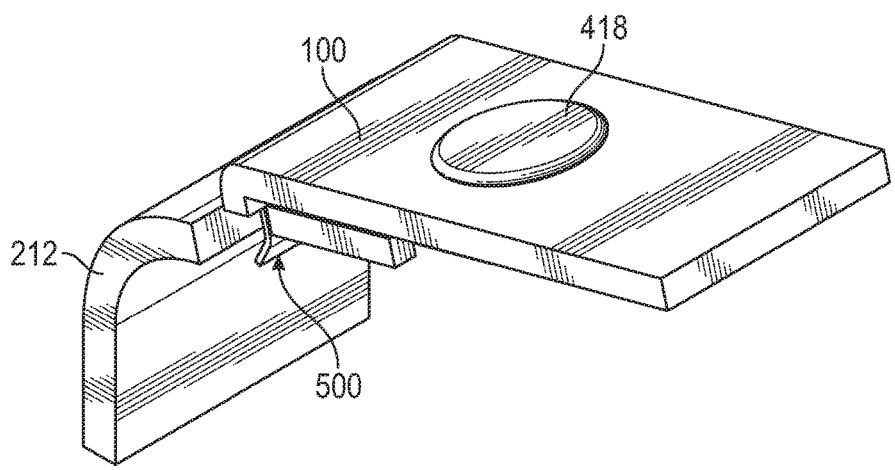
Figure 18:
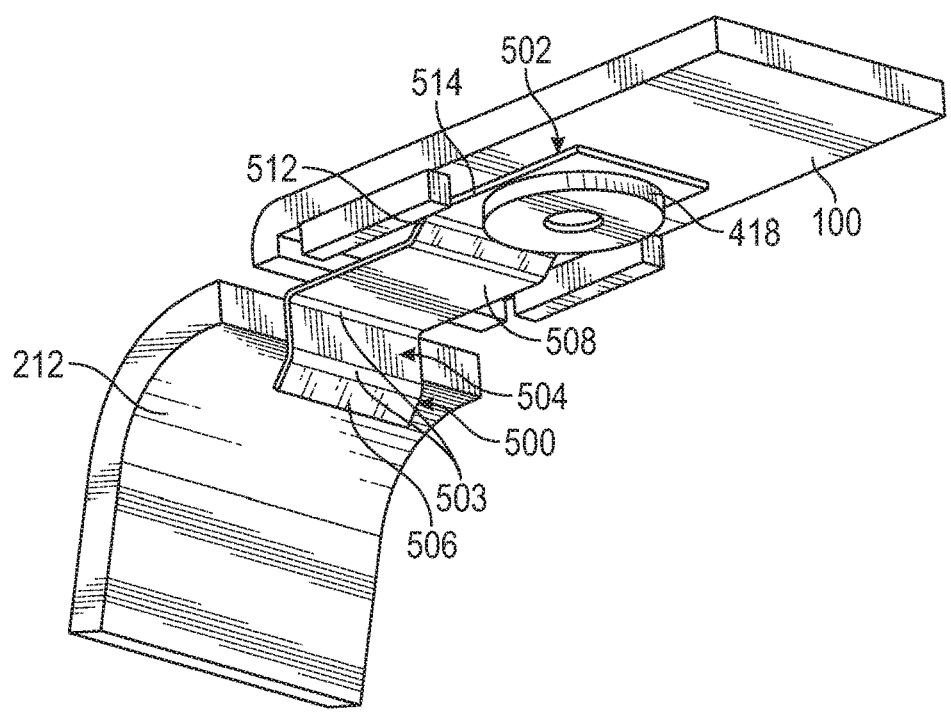
Figure 19:
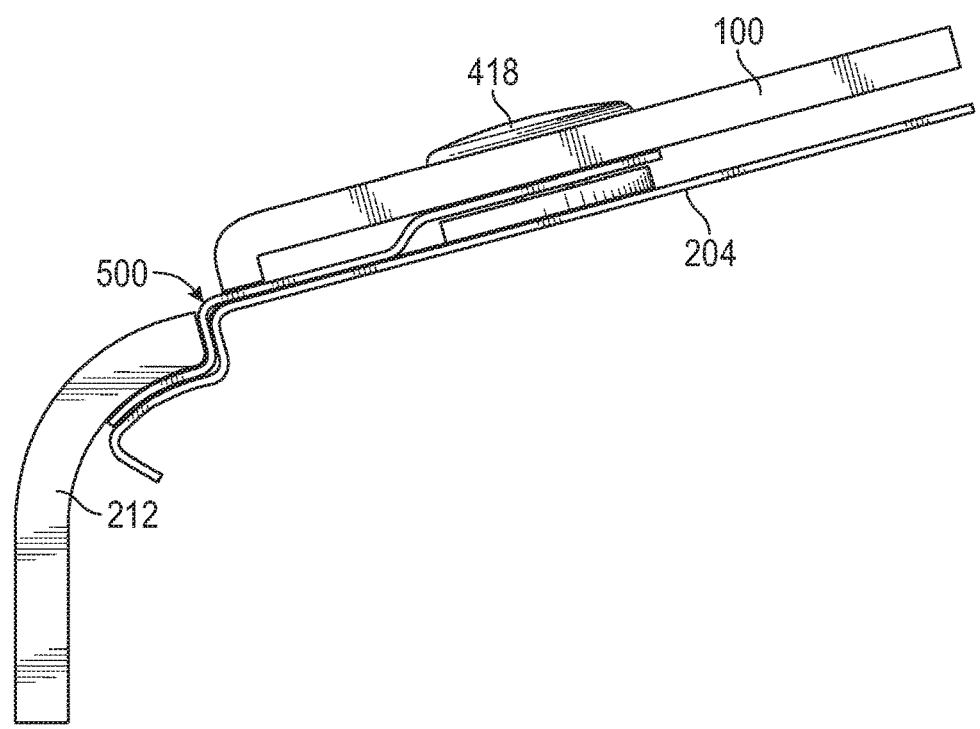
Figure 20:
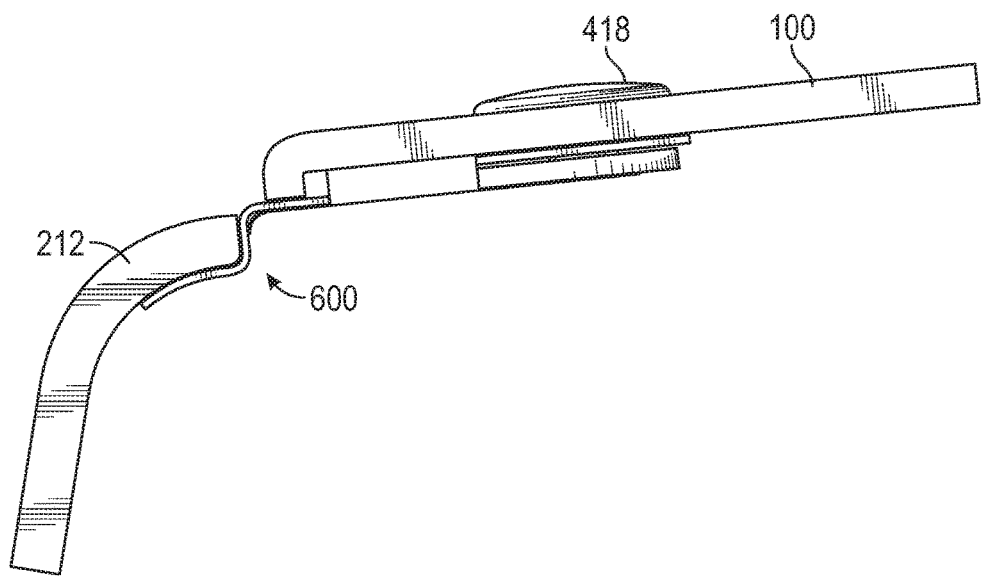
FIGS. 20-23 illustrate another embodiment of an attachment clip.
Figure 21:
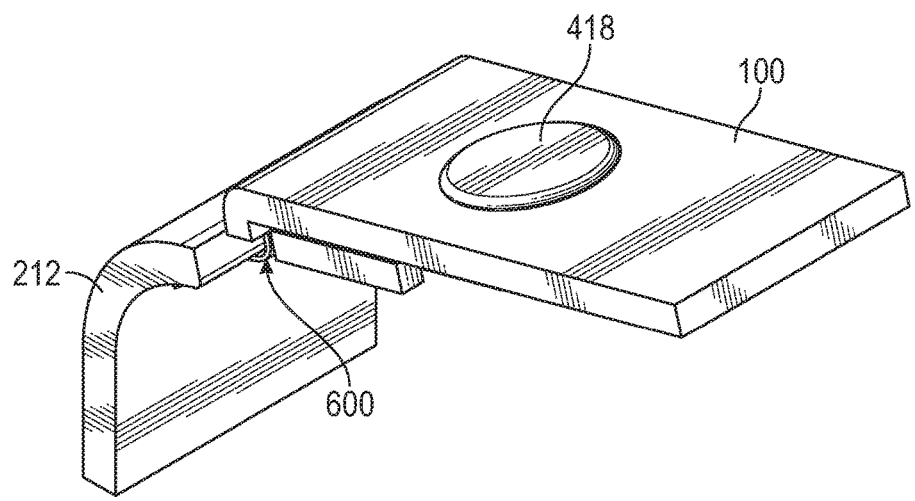
Figure 22:
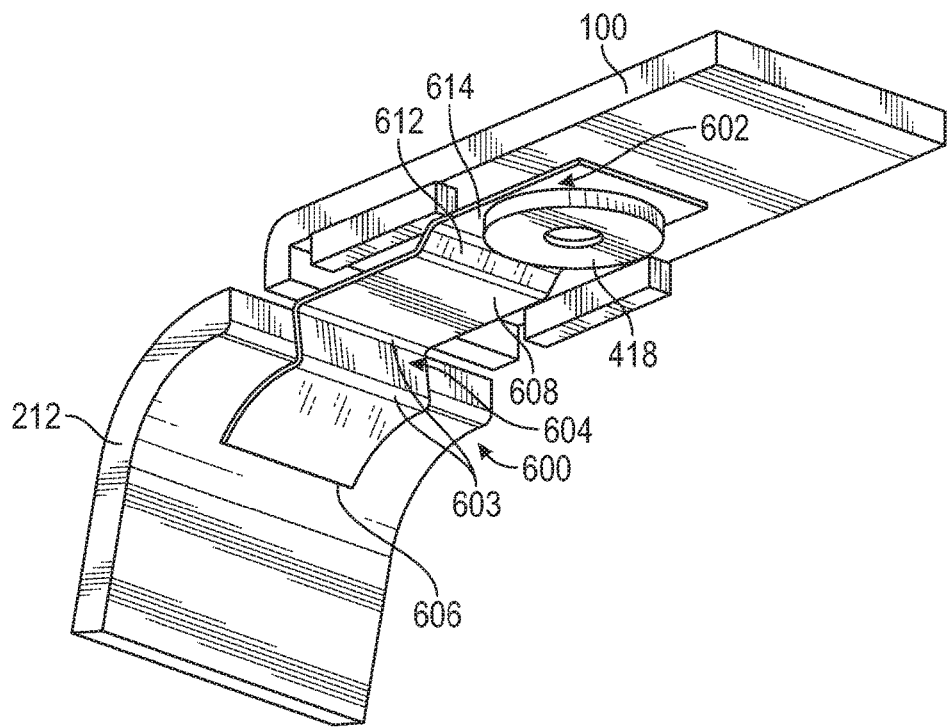
Figure 23:
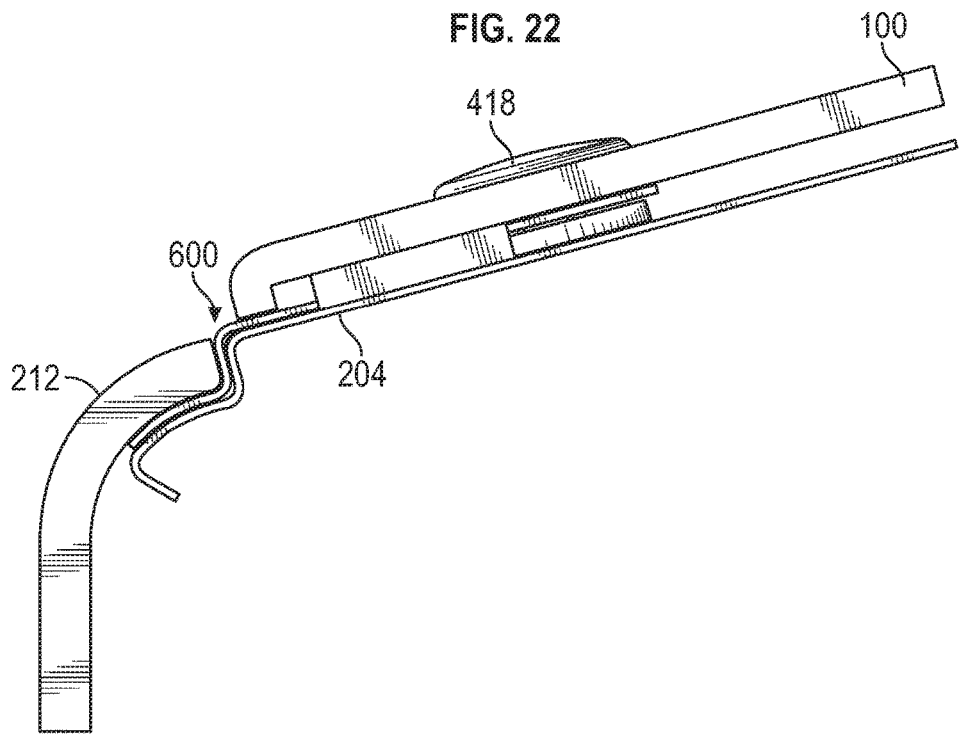

As shown in FIG. 18, The attachment clip 500 can include a clip portion 504 and an attachment portion 502. The clip portion 504 can include at least two turns/bends 503 so that an end tab (or distal flange) 506 generally curves in a direction following the bottom surface of the grille 212. However, as shown in FIG. 16, the end tab 506 may not follow directly against the grille 212, but can extend generally downwards (e.g., away from grille 212). Thus, when the hood 204 is used, the hood 204 can press the attachment clip 500 against the bottom surface of the grille 212, which can provide a tighter attachment.

The grille 212 and hood 204 can sandwich the generally vertical section of attachment portion 502 to keep the attachment clip 500 in place. In some embodiments, a fastener can be used to attach the grille 212 to the hood 204. This fastener may or may not extend through any portion of the attachment clip 500. In some embodiments, the force between the grille 212 and hood 204 can be sufficient to hold the attachment clip 500 in place without the need for any other attachment components. Additionally, the end tab 506 can additionally help prevent any motion of the attachment clip 500. A user can grip the end tab 506 to pull the attachment clip 500 off the vehicle 200.

Opposite the turn 503 is the lower segment 502 which can be generally flat/planar followed by a step feature 512 that extends upwards away from the hood 204. Following the step feature 512 is the upper segment 514, which can also be generally flat/planar. In some embodiments, the lower segment 502 and upper segment 408 can be generally parallel to one another, but this does not limit the disclosure. As discussed above with reference to attachment clip 500, upper segment 514 can include an aperture generally centered on the upper segment 414. The aperture can be generally circular, though the particular dimensions does not limit the disclosure.

The aperture can be sized to fit a pin. The pin can be the same pin as discussed above with respect to FIG. 15, though it will be understood that the particular attachment pin does not limit the disclosure.

Embodiments of the disclosed attachment clip 500 may have numerous advantages over those in the art. For example, the attachment clip 500 does not require a separate mechanical fastener. Further, the snapping feature of the pin 418, discussed above with respect to FIG. 15, is an improvement over typical clips using threaded screws. Additionally, a portion of the attachment clip 500 conforms to the vehicle hood 204 thereby locating the attachment clip 500 for the vehicle hood shield 100, whereas typical clips require a hole in the hood to locate the clip for any shield.

Moreover, as the disclosed attachment clip 500 is a "floating design", this allows for a significantly more tolerance for misalignment of the attachment clip 500 and vehicle hood shield 100 than a typical clip. Along with this, the attachment clip 500 can be located at any point on the hood 204 and is not dependent on the underside profile of the hood 204. Additionally, there are no requirements for tools when installing the attachment clip 500, the attachment clip 500 does not require the use of any spacers, and no torque fasteners are required. Further, the attachment clip 500 does not require any clearance around the hood 204 as the attachment clip 500 is in direct contact with the hood 204.

FIGS. 20-23 illustrate further embodiments of an attachment clip 600 which can be used to attach the hood shield 100 to the hood 204. The attachment clip 600 can be used instead of, or in conjunction with, the adhesive tape discussed above. As shown, the attachment clip 600 generally conforms to the hood 204 and/or the grille 212.

The attachment clip 600 can include a clip portion 602 and an attachment portion 604. The clip portion 602 can include at least two bends/turns 603 so that an end tab 606 generally conforms with a bottom surface of the grille 212. This can be different from the end tab 506 of attachment clip 500, which can extend downward and away from the grille 212.

Accordingly, the grille 212 and hood 204 can sandwich the generally vertical section of attachment portion 604 to keep the attachment clip 600 in place. In some embodiments, a fastener can be used to attach the grille 212 to the hood 204. This fastener may or may not extend through any portion of the attachment clip 600. In some embodiments, the force between the grille 212 and hood 204 can be sufficient to hold the attachment clip 600 in place without the need for any other attachment components. Additionally, the end tab 606 can additionally help prevent any motion of the attachment clip 600. A user can grip the end tab 606 to pull the attachment clip 600 off the vehicle 200.

Opposite the turn 603 is a lower segment 608 that can be generally flat/planar, followed by a step feature 612 that extends upwards away from the hood 204. Following the step feature 612 is the upper segment 614, which can also be generally flat/planar. In some embodiments, the lower segment 608 and upper segment 614 can be generally parallel to one another, but this does not limit the disclosure. As discussed above with reference to attachment clip 600, upper segment 614 can include an aperture generally centered on the upper segment 614. The aperture can be generally circular, though the particular dimensions does not limit the disclosure.

The aperture can be sized to fit a pin. The pin can be the same pin as discussed above with respect to FIG. 15, though it will be understood that the particular attachment pin does not limit the disclosure.

Embodiments of the disclosed attachment clip 600 may have numerous advantages over those in the art. For example, the attachment clip 600 does not require a mechanical fastener. Further, the snapping feature of the pin 418, discussed above with respect to FIG. 15, is an improvement over typical clips using threaded screws. Additionally, a portion of the attachment clip 600 conforms to the vehicle hood 204 thereby locating the attachment clip 600 for the vehicle hood shield 100, whereas typical clips require a hole in the hood to locate the clip for any shield.

Moreover, as the disclosed attachment clip 600 is a "floating design", this allows for a significantly more tolerance for misalignment of the attachment clip 600 and vehicle hood shield 100 than a typical clip. Along with this, the attachment clip 600 can be located at any point on the hood 204 and is not dependent on the underside profile of the hood 204. Additionally, there are no requirements for tools when installing the attachment clip 600, the attachment clip 600 does not require the use of any spacers, and no torque fasteners are required. Further, the attachment clip 600 does not require any clearance around the hood 204 as the attachment clip 600 is in direct contact with the hood 204.

Cooperation with Side Shields

Additionally, vehicle hood shield 100 can be complimented through the use of side shields. For example, side shields can be mounted to the vehicle 200 on each side of the vehicle hood shield 100 at fenders. This arrangement provides the appearance of a continuous shield that extends beyond the width, $W_H$, of the hood 204. Similarly to the vehicle hood shield 100, side shields have a main body and an attachment system as discussed above. Furthermore, side shields can be constructed similarly to the vehicle hood shield 100, the foregoing description of the vehicle hood shield 100 is incorporated into its entirety for the side shields.

From the foregoing description, it will be appreciated that an inventive vehicle hood shield and method of attachment is disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A hood shield configured for use on the hood of a vehicle, the hood shield comprising:
    a leading edge;
    a trailing edge, wherein the leading edge and the trailing edge both curve towards the vehicle;
    a leading surface extending from the leading edge towards the trailing edge, the leading surface having a first straight portion attached to the leading edge, a curved portion, and second straight portion, the curved portion being located between the first straight portion and the second straight portion;
    a diverter extending upwards from the second straight portion, the diverter having a curved front leg and a generally straight back leg; and
    a trailing surface extending from the generally straight back leg to the trailing edge.

2. The hood shield of claim 1, wherein the leading edge is configured to wrap around a leading edge of the hood.

3. The hood shield of claim 1, wherein the diverter has a generally triangular cross section.

4. The hood shield of claim 1, wherein the hood shield is configured to be attached to the vehicle with adhesives.

5. The hood shield of claim 1, wherein the diverter extends across an entire length of the hood shield.

6. The hood shield of claim 1, wherein the hood shield has a contour configuration that follows a contour configuration of the hood.

7. The hood shield of claim 1, wherein the diverter extends at least 2 inches above the leading edge and the trailing edge.

8. The hood shield of claim 1, wherein the trailing surface and the generally straight back face meet at a curved surface.

9. The hood shield of claim 1, wherein the diverter is closer to the trailing edge than the leading edge.

10. The hood shield of claim 1, wherein the first straight portion is configured to be closer to the vehicle than the second straight portion when attached to the vehicle.

11. The hood shield of claim 1, wherein a connection between the curved front leg and the second straight portion is configured to be located farther away from the vehicle than a connection between the generally straight back leg and the trailing surface when attached to the vehicle.

12. The hood shield of claim 1, wherein the trailing surface is configured to be closer to the vehicle than the second straight portion when attached to the vehicle.

13. A vehicle comprising:
    a hood shield located on a hood of the vehicle, the hood shield comprising:
        a leading edge;
        a trailing edge, wherein the leading edge and the trailing edge both curve towards the vehicle;
        a leading surface extending from the leading edge towards the trailing edge, the leading surface having a first straight portion attached to the leading edge, a curved portion, and second straight portion, the curved portion being located between the first straight portion and the second straight portion;

a diverter extending upwards from the second straight portion, the diverter having a curved front leg and a generally straight back leg; and a trailing surface extending from the generally straight back leg to the trailing edge.

14. The vehicle of claim 13, wherein the diverter has a generally triangular cross section.

15. The vehicle of claim 13, wherein the hood shield is attached to the vehicle with adhesives.

16. The vehicle of claim 13, wherein the hood shield has a contour configuration that follows a contour configuration of the hood.

17. The vehicle of claim 13, wherein the trailing surface and the generally straight back face meet at a curved surface.

18. The vehicle of claim 13, wherein the diverter is closer to the trailing edge than the leading edge.

19. The vehicle of claim 13, wherein the first straight portion is closer to the vehicle than the second straight portion.

20. The vehicle of claim 13, wherein the trailing surface is closer to the vehicle than the second straight portion.

* * * * *

UNITED STATES PATENT AND TRADEMARK OFFICE
CERTIFICATE OF CORRECTION

| | | |
|---|---|---|
| PATENT NO. | : 10,166,844 B2 | Page 1 of 1 |
| APPLICATION NO. | : 15/851525 | |
| DATED | : January 1, 2019 | |
| INVENTOR(S) | : Rose et al. | |

It is certified that error appears in the above-identified patent and that said Letters Patent is hereby corrected as shown below:

On the Title Page

Page 2, Column 2, item (56), U.S. Patent Documents, Line 76, delete "3/1999" and insert --9/1999--.

Signed and Sealed this
Twenty-fifth Day of August, 2020

Andrei Iancu
*Director of the United States Patent and Trademark Office*